(12) United States Patent
Ko et al.

(10) Patent No.: US 12,309,800 B2
(45) Date of Patent: May 20, 2025

(54) METHOD FOR TRANSMITTING AND RECEIVING SIGNAL IN WIRELESS COMMUNICATION SYSTEM, AND DEVICE SUPPORTING SAME

(71) Applicant: LG ELECTRONICS INC., Seoul (KR)

(72) Inventors: Hyunsoo Ko, Seoul (KR); Seonwook Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 482 days.

(21) Appl. No.: 17/766,163

(22) PCT Filed: Oct. 5, 2020

(86) PCT No.: PCT/KR2020/013472
§ 371 (c)(1),
(2) Date: Apr. 1, 2022

(87) PCT Pub. No.: WO2021/066603
PCT Pub. Date: Apr. 8, 2021

(65) Prior Publication Data
US 2022/0346128 A1     Oct. 27, 2022

(30) Foreign Application Priority Data

Oct. 4, 2019  (KR) .................. 10-2019-0123296

(51) Int. Cl.
*H04W 72/23* (2023.01)
*H04W 48/10* (2009.01)
*H04W 56/00* (2009.01)

(52) U.S. Cl.
CPC ........... *H04W 72/23* (2023.01); *H04W 48/10* (2013.01); *H04W 56/001* (2013.01)

(58) Field of Classification Search
CPC ........... H04W 72/1289; H04W 56/001; H04W 72/23; H04W 48/10; H04W 72/1273;
(Continued)

(56) References Cited

U.S. PATENT DOCUMENTS

2019/0068348 A1*  2/2019  Nam ............... H04L 5/0053
2020/0322807 A1* 10/2020  Si  ..................... H04W 88/10
(Continued)

FOREIGN PATENT DOCUMENTS

KR    1020190013557 A     2/2019
WO    WO-2020064939 A1 *  4/2020

OTHER PUBLICATIONS

ETRI ("Discussion on NR-U DRS design", 3GPP TSG RAN WG1 Meeting #98, R1-1908806, Aug. 26-30, 2019) (Year: 2019).*
(Continued)

*Primary Examiner* — Ji-Hae Yea
(74) *Attorney, Agent, or Firm* — BRYAN CAVE LEIGHTON PAISNER LLP

(57) ABSTRACT

The various embodiments relate to a method carried out by a terminal in a wireless communication system, and a device supporting same, where first and second information is received, and the first information relates to a time domain position of a transmitted synchronization signal/physical broadcast channel (SS/PBCH) block among a plurality of candidate SS/PBCH blocks and the second information relates to a quasi co-location (QCL) relationship for the transmitted SS/PBCH block. A physical downlink shared channel (PDSCH) based on the first information and the second information is obtained; however, it is specifically obtained in a resource region in which the resource for the PDSCH and a resource for a candidate SS/PBCH block which does not have a QCL relationship with the transmitted SS/PBCH block overlap with each other.

8 Claims, 25 Drawing Sheets

(58) Field of Classification Search
CPC ............... H04W 72/231; H04W 72/232; H04J 11/00; H04L 1/00; H04L 5/00
See application file for complete search history.

(56) References Cited

U.S. PATENT DOCUMENTS

2021/0298086 A1* 9/2021 Jiang ................. H04W 74/0833
2022/0021500 A1* 1/2022 Harada ................. H04L 5/0053

OTHER PUBLICATIONS

U.S. Appl. No. 62/870,301,Specification,Jul. 3, 2019 (Year: 2019).*
Nokia, Nokia Shanghai Bell, "Summary of open issues related to rate-matching in NR", 3GPP TSG-RAN WG1 #92bis, Apr. 16-20, 2018, R1-1805518.
LG Electronics, "Initial access and mobility for NR-U", 3GPP TSG RAN WG1 #98, Aug. 26-30, 2019, R1-1908536.
ETRI, "Discussion on NR-U DRS design", 3GPP TSG RAN WG1 Meeting #98, Aug. 26-30, 2019, R1-1908806.
Huawei, HiSilicon, "TEI for PDSCH rate matching and views on DSS", 3GPP TSG RAN WG1 Meeting #98, Aug. 26-30, 2019, R1-1909433.

* cited by examiner

| 0 | 1 | 2 | 3 |  Candidate Position for SSB transmission or reception

| 0 | 1 |  Position where SSBs are actually transmitted
| 2 | 3 |  Position where SSBs are not transmitted 1　1　0　0　ssb-PositionsinBurst

FIG. 16

METHOD FOR TRANSMITTING AND RECEIVING SIGNAL IN WIRELESS COMMUNICATION SYSTEM, AND DEVICE SUPPORTING SAME

CROSS-REFERENCE TO RELATED APPLICATIONS

This application is the National Stage filing under 35 U.S.C. § 371 of International Application No. PCT/KR2020/013472, filed on Oct. 5, 2020, which claims the benefit of Korean Patent Application No. 10-2019-0123296, filed on Oct. 4, 2019, the contents of which are all hereby incorporated by reference herein in their entirety.

TECHNICAL FIELD

Various embodiments relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Various embodiments may provide a method of transmitting and receiving a signal in a wireless communication system and an apparatus for supporting the method.

Various embodiments may provide a rate-matching method of a control channel and/or a data channel in a wireless communication system and an apparatus for supporting the method.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method of transmitting and receiving a signal in a wireless communication system and an apparatus for supporting the method.

Various embodiments may provide a method performed by a user equipment (UE) in a wireless communication system.

According to various embodiments, the method may include receiving first information related to a time domain position of a synchronization signal/physical broadcast channel (SS/PBCH) block transmitted in a preconfigured time duration including a plurality of candidate SS/PBCH blocks, and obtaining a physical downlink shared channel (PDSCH) based on the first information.

According to various embodiments, the PDSCH may not be obtained in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to obtain the PDSCH in a resource region that overlaps with the PDSCH resource allocation among all candidate SS/PBCH blocks corresponding to the transmitted SS/PBCH block among the plurality of candidate SS/PBCH blocks.

According to various embodiments, the method may further include receiving downlink control information (DCI) including information related to the PDSCH resource allocation.

A slot included in the PDSCH resource allocation may include 2 candidate SS/PBCH blocks among a plurality of candidate SS/PBCH blocks.

The DCI may include second information related to configuring whether the PDSCH is obtainable in a resource region in which the PDSCH resource allocation and the two candidate SS/PBCH blocks overlap with each other.

According to various embodiments, based on that the second information includes 1-bit: (i) the 1-bit having a first value may be mapped to the PDSCH being obtainable in a resource region in which the PDSCH resource allocation and the two candidate SS/PBCH blocks overlap with each other, and (ii) the 1-bit having a second value may be mapped to the PDSCH being unobtainable in the resource region in which the PDSCH resource allocation and the two candidate SS/PBCH blocks overlap with each other.

According to various embodiments, based on that the second information includes 2-bit: the 2-bit indicates whether the PDSCH is obtainable in the resource region in which the PDSCH resource allocation and the two candidate SS/PBCH blocks overlap with each other, in a bitmap with respect to each of the two candidate SS/PBCH blocks.

According to various embodiments, the one or more candidate SS/PBCH blocks may not include the transmitted SS/PBCH block.

According to various embodiments, the remaining candidate SS/PBCH blocks may include the transmitted SS/PBCH block.

According to various embodiments, rate-matching may be performed in a resource region in which the PDSCH resource allocation and an SS/PBCH transmission resource overlap with each other.

According to various embodiments, the rate-matching may be performed in units of resource blocks (RBs).

According to various embodiments, (i) based on that information for configuring a time duration for discovery is provided, the preconfigured time duration may be the time duration for discovery.

According to various embodiments, (ii) based on that the information for configuring theme duration for discovery is not provided, the preconfigured time duration may be a half frame.

According to various embodiments, the method may further include receiving information related to a quasi co-location (QCL) relationship between the plurality of candidate SS/PBCH blocks.

According to various embodiments, all the candidate SS/PBCH blocks corresponding to the transmitted SS/PBCH block may have a QCL relationship with the transmitted SS/PBCH block.

According to various embodiments, all the candidate SS/PBCH blocks corresponding to the transmitted SS/PBCH block may be identified based on the information related to the QCL relationship.

According to various embodiments, the plurality of candidate SS/PBCH blocks may be preconfigured for an unlicensed band.

Various embodiments may provide an apparatus operating in a wireless communication system.

According to various embodiments, the apparatus may include a memory, and at least one processor connected to the memory.

According to various embodiments, the one or more processors may receive first information related to a time domain position of a synchronization signal/physical broadcast channel (SS/PBCH) block transmitted in a preconfigured time duration including a plurality of candidate SS/PBCH blocks and may obtain a physical downlink shared channel (PDSCH) based on the first information.

According to various embodiments, the PDSCH may not be obtained in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to obtain a PDSCH in a resource region that overlaps with the PDSCH resource allocation among all candidate SS/PBCH blocks corresponding to the transmitted SS/PBCH block among the plurality of candidate SS/PBCH blocks.

According to various embodiments, the one or more processors may receive downlink control information (DCI) including information related to the PDSCH resource allocation.

According to various embodiments, a slot included in the PDSCH resource allocation may include 2 candidate SS/PBCH blocks among a plurality of candidate SS/PBCH blocks.

According to various embodiments, the DCI may include second information related to configuring whether the PDSCH is obtainable in a resource region in which the PDSCH resource allocation and the two candidate SS/PBCH blocks overlap with each other.

According to various embodiments, based on that the second information includes 1-bit: (i) the 1-bit having a first value may be mapped to the PDSCH being obtainable in a resource region in which the PDSCH resource allocation and the two candidate SS/PBCH blocks overlap with each other, and (ii) the 1-bit having a second value may be mapped to the PDSCH being unobtainable in the resource region in which the PDSCH resource allocation and the two candidate SS/PBCH blocks overlap with each other.

According to various embodiments, based on that the second information includes 2-bit: the 2-bit indicates whether the PDSCH is obtainable in the resource region in which the PDSCH resource allocation and the two candidate SS/PBCH blocks overlap with each other, in a bitmap with respect to each of the two candidate SS/PBCH blocks.

According to various embodiments, rate-matching may be performed in a resource region in which the PDSCH resource allocation related to the PDSCH and an SS/PBCH transmission resource overlap with each other, and the rate-matching may be performed in units of resource blocks (RBs).

According to various embodiments, the apparatus may communicate with one or more of a mobile terminal, a network, and an autonomous driving vehicle except for a vehicle including the apparatus.

Various embodiments may provide a method performed by a base station (BS) in a wireless communication system.

According to various embodiments, the method may include transmitting first information related to a time domain position of a synchronization signal/physical broadcast channel (SS/PBCH) block transmitted in a preconfigured time duration including a plurality of candidate SS/PBCH blocks, and transmitting a physical downlink shared channel (PDSCH) based on the first information.

According to various embodiments, the PDSCH may not be transmitted in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to transmit the PDSCH in a resource region that overlaps with the PDSCH resource allocation among all candidate SS/PBCH blocks corresponding to the transmitted SS/PBCH block among the plurality of candidate SS/PBCH blocks.

Various embodiments may provide an apparatus operating in a wireless communication system.

According to various embodiments, the apparatus may include a memory, and at least one processor connected to the memory.

According to various embodiments, the one or more processors may transmit first information related to a time domain position of a synchronization signal/physical broadcast channel (SS/PBCH) block transmitted in a preconfigured time duration including a plurality of candidate SS/PBCH blocks, and may transmit a physical downlink shared channel (PDSCH) based on the first information.

According to various embodiments, the PDSCH may not be transmitted in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to transmit the PDSCH in a resource region that overlaps with the PDSCH resource allocation among all candidate SS/PBCH blocks corresponding to the transmitted SS/PBCH block among the plurality of candidate SS/PBCH blocks.

Various embodiments may provide an apparatus operating in a wireless communication system.

According to various embodiments, the apparatus may include one or more processors, and at least one memory configured to store one or more instructions for causing the one or more processors to perform a method.

According to various embodiments, the method may include receiving first information related to a time domain position of a synchronization signal/physical broadcast channel (SS/PBCH) block transmitted in a preconfigured time duration including a plurality of candidate SS/PBCH blocks, and obtaining a physical downlink shared channel (PDSCH) based on the first information.

According to various embodiments, the PDSCH may not be obtained in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to obtain the PDSCH in a resource region that overlaps with the PDSCH resource allocation among all candidate SS/PBCH blocks corresponding to the transmitted SS/PBCH block among the plurality of candidate SS/PBCH blocks.

Various embodiments may provide a processor-readable medium for storing one or more instructions for causing at least one processor to perform a method.

According to various embodiments, the method may include receiving first information related to a time domain position of a synchronization signal/physical broadcast channel (SS/PBCH) block transmitted in a preconfigured time duration including a plurality of candidate SS/PBCH blocks, and obtaining a physical downlink shared channel (PDSCH) based on the first information.

According to various embodiments, the PDSCH may not be obtained in a resource region in which a PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to obtain the PDSCH in a resource region that overlaps with the PDSCH resource allocation among all candidate SS/PBCH blocks corresponding to the transmitted SS/PBCH block among the plurality of candidate SS/PBCH blocks.

It will be appreciated by persons skilled in the art that the objects that could be achieved with the present disclosure are not limited to what has been particularly described hereinabove and the above and other objects that the present disclosure could achieve will be more clearly understood from the following detailed description.

Advantageous Effects

Various embodiments may provide a method of transmitting and receiving a signal in a wireless communication system and an apparatus for supporting the method.

Various embodiments may provide a rate-matching method of a control channel and/or a data channel in a wireless communication system and an apparatus for supporting the method.

According to various embodiments, whether to perform rate-matching at a resource position for an SSB candidate index, which has a QCL relationship an SSB index indicated by an ATSS but at which an SSB is not actually transmitted, may be configured, thereby increasing resource usage efficiency.

It will be appreciated by persons skilled in the art that that the effects that can be achieved through the various embodiments are not limited to those described above and other advantageous effects of the various embodiments will be more clearly understood from the following detailed description. That is, unintended effects according to implementation of the present disclosure may be derived by those skilled in the art from the various embodiments.

DESCRIPTION OF DRAWINGS

The accompanying drawings, which are included to provide a further understanding of the various embodiments, provide the various embodiments together with detail explanation. Yet, a technical characteristic the various embodiments is not limited to a specific drawing. Characteristics disclosed in each of the drawings are combined with each other to configure a new embodiment. Reference numerals in each drawing correspond to structural elements.

FIG. 16 is a diagram showing an example of an SSB candidate position according to various embodiments;

MODE FOR CARRYING OUT THE DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

For clarity of description, various embodiments are described in the context of a 3GPP communication system (e.g., including LTE, NR, 6G, and next-generation wireless communication systems), to which the technical spirit of the various embodiments is not limited. For the background art, terms, and abbreviations used in the description of the various embodiments, refer to the technical specifications published before the present disclosure. For example, the documents of 3GPP TS 37.213, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and so on may be referred to.

1. 3GPP SYSTEM 1.1. Physical Channels and Signal Transmission and Reception

In a wireless access system, a UE receives information from a BS on a DL and transmits information to the BS on a UL. The information transmitted and received between the UE and the BS includes general data information and various types of control information. There are many physical channels according to the types/usages of information transmitted and received between the BS and the UE.

Figure 1:
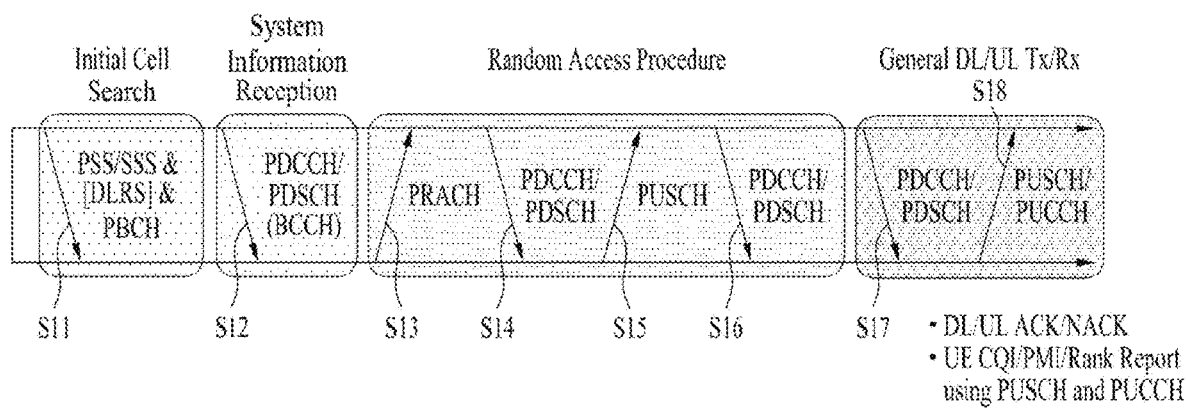
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When a UE is powered on or enters a new cell, the UE performs initial cell search (S11). The initial cell search involves acquisition of synchronization to a BS. Specifically, the UE synchronizes its timing to the BS and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the BS.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the BS, the UE may perform a random access procedure with the BS (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called UCI. The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
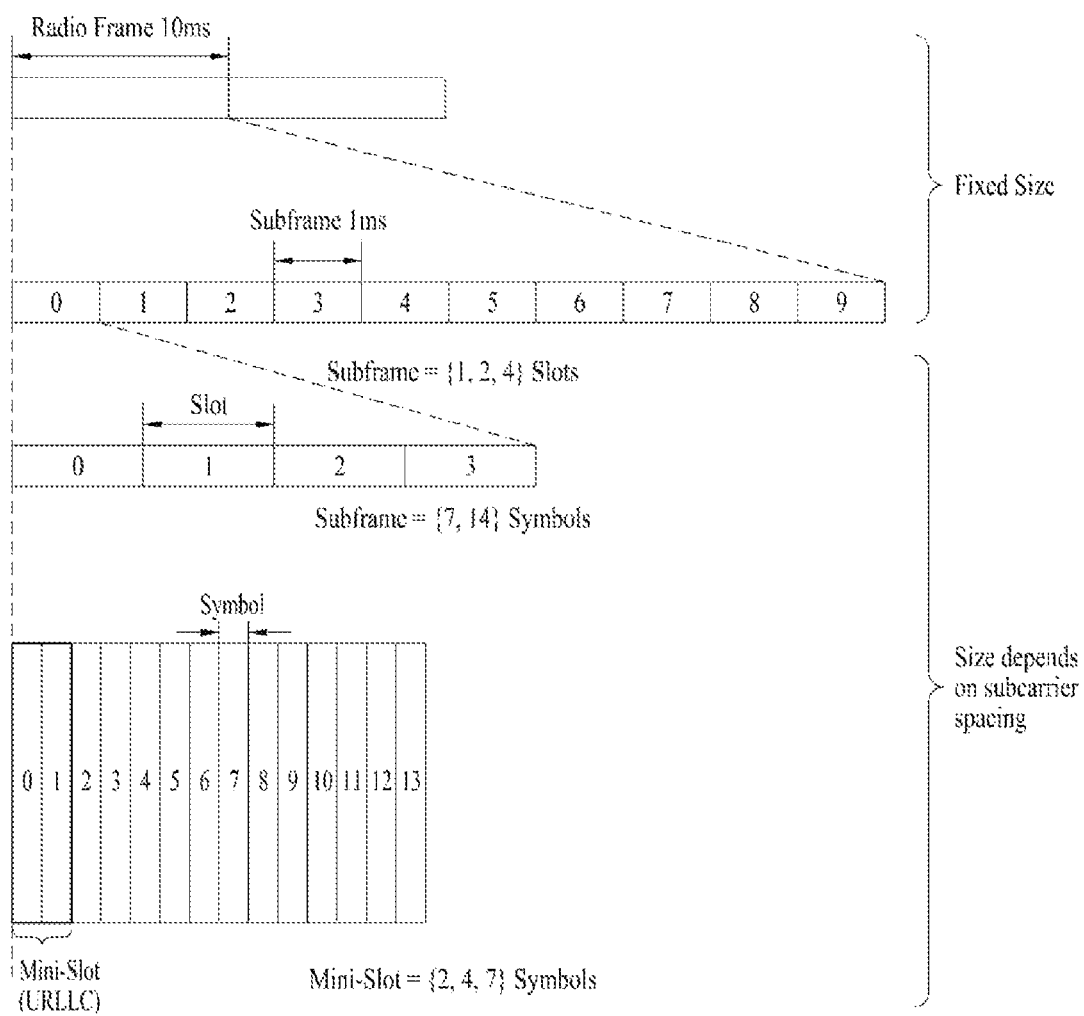
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), $\mu$ and a CP are obtained from RRC parameters provided by the BS.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |

TABLE 1-continued

| μ | Δf = $2^μ$ · 15 [kHz] | Cyclic prefix |
|---|---|---|
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(Δf_{max}*N_f)$ where $Δf_{max}=480*10^3$ Hz and a value $N_f$ related to a fast Fourier transform (FFT) size or an inverse fast Fourier transform (IFFT) size is given as $N_f$=4096. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(Δf_{max}*N_f/100)*T_c=10$ ms. Each radio frame includes 10 subframes each having a duration of $T_{sf}=(Δf_{max}*N_f/1000)*T_c=1$ ms. There may exist one set of frames for UL and one set of frames for DL. For a numerology μ, slots are numbered with $n^μ_s∈\{0, \ldots, N^{slot,μ}_{subframe}-1\}$ in an increasing order in a subframe, and with $n^μ_{s,f}∈\{0, \ldots, N^{slot,μ}_{frame}-1\}$ in an increasing order in a radio frame. One slot includes $N^μ_{symb}$ consecutive OFDM symbols, and $N^μ_{symb}$ depends on a CP. The start of a slot $n^μ_s$ in a subframe is aligned in time with the start of an OFDM symbol $n^μ_s*N^μ_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,μ}_{slot}$ | $N^{subframe,μ}_{slot}$ |
|---|---|---|---|
| 2 | 12 | 40 | 4 |

In the above tables, $N^{slot}_{symb}$ represents the number of symbols in a slot, $N^{frame,μ}_{slot}$ represents the number of slots in a frame, and $N^{subframe,μ}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
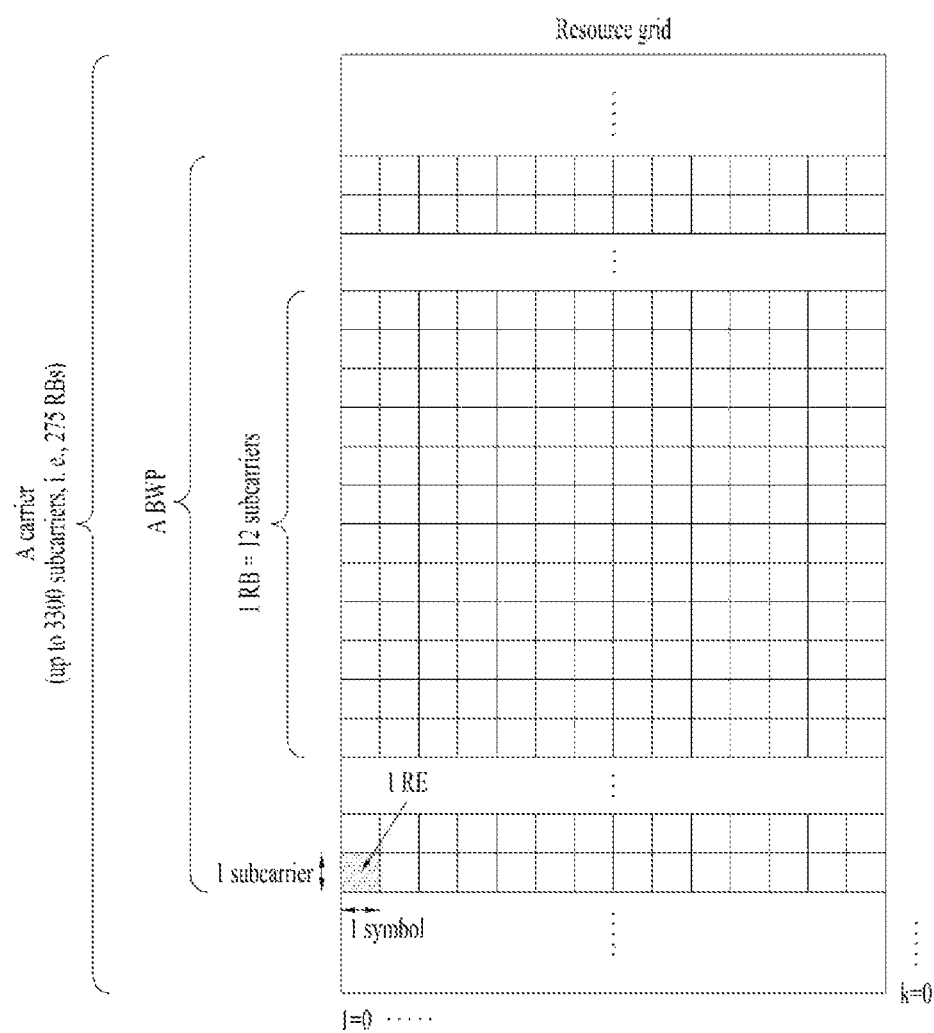
FIG. 3 is a diagram illustrating a slot structure in an NR system to which various embodiments are applicable.

FIG. 3 is a diagram illustrating a slot structure in an NR system to which various embodiments are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A BWP, which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
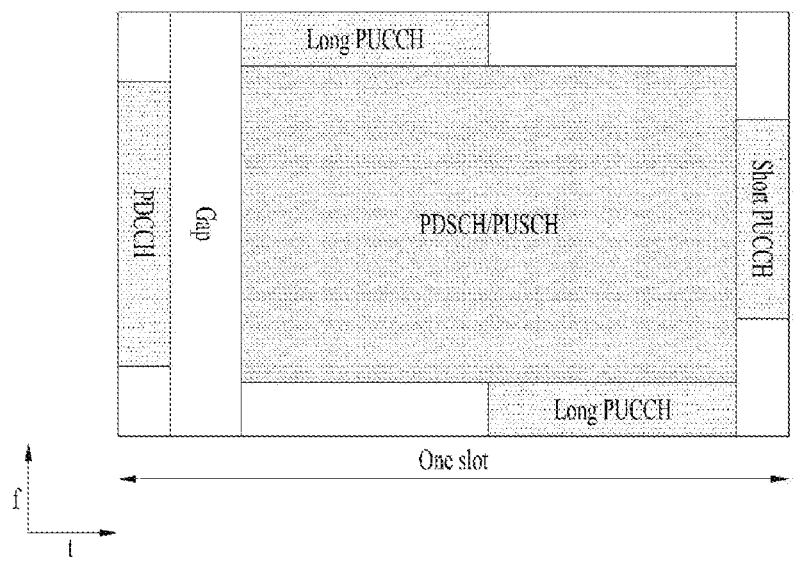
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

1.3. Channel Structures
1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an ACK/NACK information for DL data, channel state information (CSI), a scheduling request (SR), and so on.

The PDCCH carries DCI and is modulated in QPSK. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration.

Table 5 lists exemplary features of the respective search space types.

Table 6 lists exemplary DCI formats transmitted on the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol (s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-

TABLE 5

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI SFI-RNTI, TPC-PUSCH-RNTI, TPC-PUCCH-RNTI. TPC-SRS-RNTT, C-RNTI, MCS-C-RNTI, or CS-RNTI(s) | |
| | UE Specific | C-RNTI, or MCS-C-RNTI, or CS-RNTI(s) | User specific PDSCH decoding | statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARO, SR | Sequence selection |
| 1 | 4-14 | ≤2 | HARQ, [SR] | Sequence modulation |
| 2 | 1-2 | >2 | HARQ, CSI, [SR] | CP-OFDM |
| 2 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

1.4. QCL (Quasi Co-Located or Quasi Co-Location)

In various embodiments, QCL may refer to one of the following.

(1) If two antenna ports are "quasi co-located (QCL)", a UE may assume that large-scale properties of a signal received from a first antenna port is inferred from a signal received from another antenna port. Here, the "large-scale properties" may include one or more of the following.
Delay spread
Doppler spread
Frequency shift
Average received power
Received Timing (2) If two antenna ports are "quasi co-located (QCL)", the UE may assume that large-scale properties of a channel over which a symbol on one antenna port is conveyed is inferred from a channel over which a symbol on another antenna port is conveyed. Here, the "large-scale properties" may include one or more of the following.
Delay spread
Doppler spread
Doppler shift
Average gain
Average delay
Average angle (AA): QCL may mean that it is possible to configure receive beam directions (and/or receive beam widths/sweeping degrees) when transmission signals from other antenna port(s) are attempted to be received to be the same or similar (in connection with each other) and to receive and process the transmission signals based on an AA estimated from specific antenna port(s) between antenna port(s) that is ensured to be QCL in terms of the AA (In other words, QCL may mean that reception performance is ensured above a specific level when the operation is performed in this way).
Angular spread (AS): QCL may mean that an AS estimated from one antenna port is derived/estimated/applied from an AS estimated from another antenna port between two antenna ports that are ensured to be QCL in terms of the AS.
Power Angle(-of-Arrival) Profile (PAP): A PAP estimated from one antenna port is derived/estimated/applied/(quasi-)treated the same from a PAP estimated from another antenna port between two antenna ports that are ensured to be QCL in terms of the PAP.

According to various embodiments, all of the aforementioned concepts defined in (1) or (2) may be applied to QCL. As another similar form, the QCL concept may be modified and applied as if it is possible to transmit signals at a co-location between antenna ports in which QCL assumption is established (e.g., the UE may assume antenna ports that transmit the signals at the same transmission points).

According to various embodiments, partial QCL for two antenna ports may mean that at least one QCL parameter of at least one QCL parameter among the aforementioned QCL parameters for one antenna port is assumed/applied/used to be the same as the other antenna port (when a related operation is applied based thereon, performance is ensured above a predetermined level).

1.5. Synchronization Signal Block (SSB) Transmission and Related Operation

Figure 5:
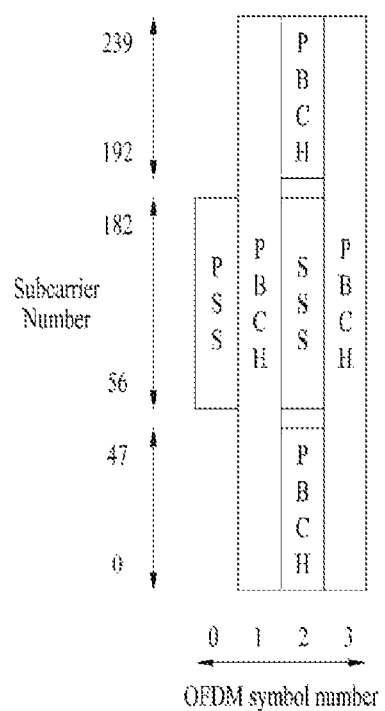
FIG. 5 is a diagram illustrating the structure of a synchronization signal block (SSB) to which various embodiments are applicable.

FIG. 5 is a diagram illustrating the structure of a synchronization signal block (SSB) to which various embodiments are applicable.

A UE may perform cell search, system information acquisition, beam alignment for initial access, DL measurement, and so on based on an SSB. The term SSB is interchangeably used with synchronization signal/physical broadcast channel (SS/PBCH) block.

Referring to FIG. 5, the SSB to which various embodiments are applicable may include 20 RBs in four consecutive OFDM symbols. Further, the SSB may include a PSS, an SSS, and a PBCH, and the UE may perform cell search, system information acquisition, beam alignment for initial access, DL measurement, and so on based on the SSB.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Cell Search

Cell search refers to a procedure in which the UE acquires time/frequency synchronization of a cell and detects a cell ID (e.g., physical layer cell ID (PCID)) of the cell. The PSS may be used to detect a cell ID within a cell ID group, and the SSS may be used to detect the cell ID group. The PBCH may be used in detecting an SSB (time) index and a half-frame.

The cell search procedure of the UE may be summarized as described in Table 8 below.

TABLE 8

| | Type of Signals | Operations |
|---|---|---|
| $1^{st}$ step | PSS | * SS/PBCH block (SSB) symbol timing acquisition<br>* Cell ID detection within a cell ID group (3 hypothesis) |
| $2^{nd}$ Step | SSS | * Cell ID group detection (336 hypothesis) |
| $3^{rd}$ Step | PBCH DMRS | * SSB index and Half frame (HF) index (Slot and frame boundary detection) |
| $4^{th}$ Step | PBCH | * Time information (80 ms, System Frame Number (SFN), SSB index, HF)<br>* Remaining Minimum System Information (RMSI) Control resource set (CORESET)/Search space configuration |
| $5^{th}$ Step | PDCCH and PDSCH | * Cell access information<br>* RACH configuration |

There are 336 cell ID groups each including three cell IDs. There are 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
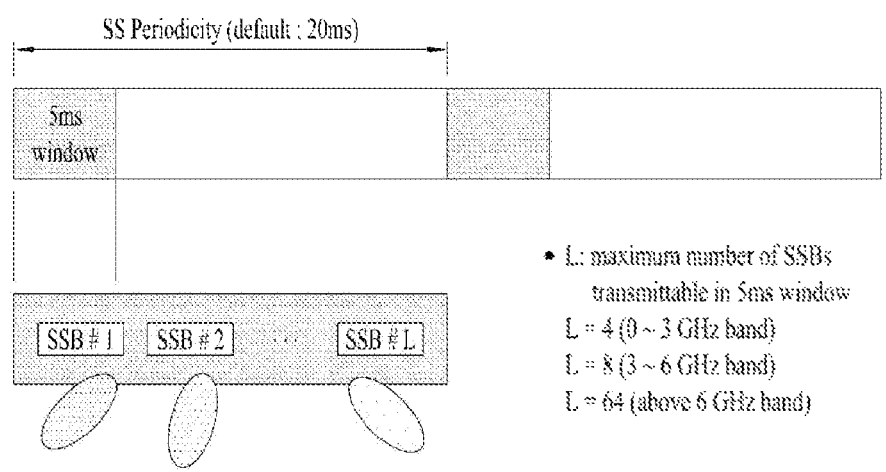
FIG. 6 is a diagram illustrating an exemplary SSB transmission method to which various embodiments are applicable.

FIG. 6 is a diagram illustrating an exemplary SSB transmission method to which various embodiments are applicable.

Referring to FIG. 6, the SSB is periodically transmitted according to an SSB periodicity. A default SSB periodicity assumed by the UE during initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4

For frequency range from 3 GHz to 6 GHz, L=8

For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in time order within the SSB burst set (i.e., half-frame). In the description of various embodiments, the candidate SSB and the SSB candidate may be interchangeably used.

Case A: 15-kHz SCS: The indexes of the first symbols of candidate SSBs are given as {2, 8}+14*n
for operation without shared spectrum channel access (e.g., L-band and LCell): where n=0, 1 for a carrier frequency equal to or less than 3 GHz and n=0, 1, 2, 3 for a carrier frequency of 3 GHz to 6 GHz.
For operation with shared spectrum channel access (e.g., U-band and UCell): where n=0, 1, 2, 3, 4.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n For operation without shared spectrum channel access: (1) In the case of a paired spectrum operation where n=0, if for a carrier frequency equal to or less than 3 GHz and n=0, 1, 2, 3 for a carrier frequency within FR1 and greater than 3 GHz. (2) In the case of a non-paired spectrum operation, where n=0, 1 for a carrier frequency equal to or less than 2.4 GHz and n=0, 1, 2, 3 for a carrier frequency within FR1 and greater than 2.4 GHz.

For operation with shared spectrum channel access: where n=0, 1, 2, 3, 4, 6, 7, 8, 9.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

The UE may acquire DL synchronization by detecting a SSB. The UE may identify a structure of an SSB burst set based on the detected SSB index, and thus may detect a symbol/slot/half-frame boundary. The number of a frame/half-frame to which the detected SSB belongs may be identified using SFN information and half-frame indication information.

Channel Measurement and Rate-Matching

Figure 7:
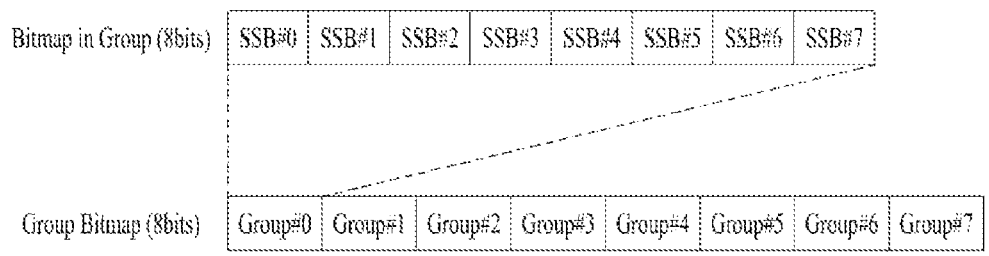
FIG. 7 is a diagram showing an example of a method of indicating an actually transmitted SSB SSB_tx to which various embodiments are applicable.

FIG. 7 is a diagram showing an example of a method of indicating an actually transmitted SSB SSB_tx to which various embodiments are applicable.

In the SSB burst set, the maximum of L SSBs may be transmitted, and the number/location of the actually transmitted SSBs may be different for each BS/cell. The number/location of the actually transmitted SSBs may be used for rate-matching and measurement, and information on the actually transmitted SSBs (e.g., ssb-PositionsInBurst) may be indicated as follows.

When the information is related to rate-matching: The information may be indicated via UE-specific RRC signaling or RMSI. The UE-specific RRC signaling may include a full (e.g., a length L) bitmap within an entire frequency range below 6 GHz and above 6 GHz. In contrast, the RMSI may include a full bitmap below 6 GHz, and may include a compressed bitmap above 6 GHz as shown in the drawing. In detail, information on the actually transmitted SSB may be indicated based on group-bitmap (8 bits)+inter-group bitmap (8 bits). Here, a resource (e.g., RE) indicated through UE-specific RRC signaling or the RMSI may be reserved for SSB transmission, and PDSCH/PUSCH, etc. may be rate-matched in consideration of a SSB resource.

When the information is related to measurement: In an RRC connected mode, a network (e.g., a BS) may indicate an SSB to be measured in a measurement period. The SSB set may be indicated for each frequency layer. When there is no indication for the SSB set, a default SSB set may be used. The default SSB set may include all SSBs in the measurement period. The SSB set may be indicated using a full (e.g., a length L) of RRC signaling. In an RRC idle mode, the default SSB set may be used.

2. UNLICENSED BAND/SHARED SPECTRUM

A wireless communication system applicable to various embodiments may include an NR-unlicensed spectrum (NR-U) wireless communication system.

In the following description, a cell operating in a licensed band (hereinafter an L-band) may be defined as an LCell and a carrier of the LCell may be defined as a (DL/UL) LCC. A cell operating in an unlicensed band (hereinafter a U-band) may be defined as a UCell and a carrier of the UCell may be defined as a (DL/UL) UCC. A carrier/carrier-frequency of a cell may refer to an operation frequency (e.g., a center frequency) of the cell. The cell/carrier (e.g., CC) may be collectively referred to as a cell.

When a UE and a BS transmit and receive signals through a LCC and a UCC that are carrier-coupled to each other, the LCC may be set to a primary CC (PCC) and the UCC may be set to a secondary CC (SCC). As shown in FIG. 9(b), the UE and the BS may transmit and receive signals through one UCC or a plurality of UCCs that are carrier-coupled to each other. That is, the UE and the BS may transmit and receive signals through only UCC(s) without an LCC. For a stand-alone operation, transmission of a PRACH, a PUCCH, a PUSCH, and an SRS, and so on may be supported in the UCell.

Hereinafter, a signal transmission and reception operation in an unlicensed band described in the description of various embodiments may be performed based on the aforementioned deployment scenario (unless otherwise stated).

Unless otherwise stated, the following definitions may be applied to terms used in the description of various embodiments (in relation to the unlicensed band).

Channel: This may include consecutive RBs in which a channel access procedure is performed in a shared spectrum and may refer to a carrier or a portion of the carrier.

Channel access procedure (CAP): This may refer to a procedure of evaluating channel availability based on sensing in order to determine whether other communication node(s) use a channel before transmitting signals. A basic unit for sensing may be a sensing slot of a duration of Tsl=9 us. The BS or the UE may sense the channel during a sensing slot duration, and when power detected for at least 4 us within a sensing slot duration is less than energy detection threshold XThresh, the sensing slot duration Tsl may be considered to be an idle state. Otherwise, the sensing slot duration Tsl=9 us may be considered to be a busy state. The CAP may be referred to as Listen-Before-Talk (LBT).

Channel Occupancy: This may refer to corresponding transmission(s) on channel(s) by the BS/UE after the channel access procedure.

Channel Occupancy Time (COT): This may refer to a total time for performing transmission(s) on the channel by the BS/UE and any BS/UE(s) that share channel occupancy after the BS/UE performs the channel access procedure. When the COT is determined, if a transmission gap is equal to or less than 25 us, a gap duration may also be counted in the COT. The COT may be shared for transmission between the BS and corresponding UE(s).

DL transmission burst: This may be defined as a transmission set from a BS without a gap greater than 16 micro-seconds (us). Transmissions from the BS, which are separated by a gap greater than 16 us, may be considered to be separate DL transmission bursts. The BS may perform transmission(s) after the gap rather than sensing channel availability within the DL transmission burst.

UL transmission burst: This may be defined as a transmission set from a UE without a gap greater than 16 us. Transmissions from the UE, which are separated by a gap greater than 16 us, may be considered to be separate UL transmission bursts. The UE may perform transmission(s) after the gap rather than sensing channel availability within the UL transmission burst.

Discovery burst: This may refer to a DL transmission burst including a set of signal(s) and/or channel(s), which are limited within a (time) window and are related to a duty cycle. In an LTE-based system, the discovery burst may refer to transmission(s) initiated by a BS, may include a PSS, a SSS, and a cell-specific RS (CRS), and may further include a non-zero power CSI-RS. In an NR-based system, the discovery burst may refer to transmission(s) initiated by a BS, may include at least a SS/PBCH block, and may further include a CORESET for a PDCCH for scheduling a PDSCH having SIB1, a PDSCH for carrying the SIB1, and/or the non-zero power CSI-RS.

Figure 8:
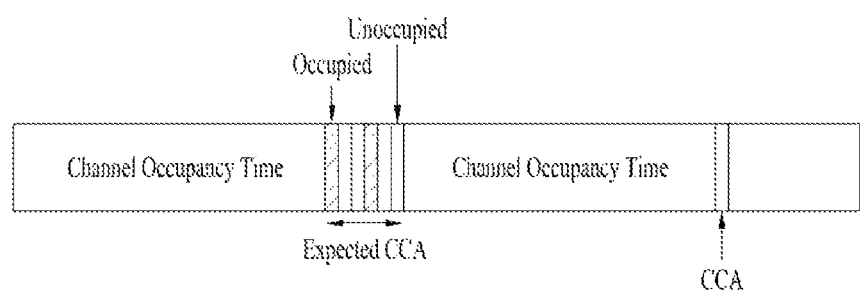
FIG. 8 is a diagram showing an example of a method of occupying a resource within an unlicensed band to which various embodiments are applicable.

FIG. 8 is a diagram showing an example of a method of occupying a resource within an unlicensed band to which various embodiments are applicable.

Referring to FIG. 8, a communication node (e.g., a BS and a UE) within the unlicensed band needs to determine whether other communication node(s) use a channel before transmitting signals. To this end, the communication node within the unlicensed band may perform a channel access procedure (CAP) in order to access channel(s) in which transmission(s) is performed. The channel access procedure may be performed based on sensing. For example, the communication node may check whether other communication node(s) transmit signals by performing carrier sensing (CS) before transmitting signals. When it is determined that other communication node(s) do not transmit signals, it may be defined that Clear Channel Assessment (CCA) is checked. When there is a CCA threshold (e.g., XThresh) that is predefined or configured by a higher layer (e.g., RRC), the communication node may determine a channel state to be busy when detecting higher energy than the CCA threshold from the channel, and otherwise, the communication node may determine the channel state to be idle. When determining the channel state to be idle, the communication node may start signal transmission in the unlicensed band. The CAP may be replaced with LBT.

Table 9 below shows a channel access procedure (CAP) supported in the NR-U.

TABLE 9

| | Type | Explanation |
|---|---|---|
| DL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

LBT-subBand (SB) (or a RB Set)

One cell (or a carrier (e.g., CC)) or a BWP configured for a UE may be configured with a wideband having a larger BandWidth (BW) compared with the existing LTE in a wireless communication system that supports an unlicensed band. However, a BW required by CCA based on an independent LBT operation may be limited based on the regulation or the like. When a sub-band (SB) in which separate LBT is performed is defined as an LBT-SB, one wideband cell/BWP may include a plurality of LBT-SBs. An RB set included in the LBT-SB may be configured via higher-layer (e.g., RRC) signaling. Thus, one cell/BWP may include one or more LBT-SBs based on (i) a BW of a cell/BWP and (ii) RB set allocation information.

Figure 9:
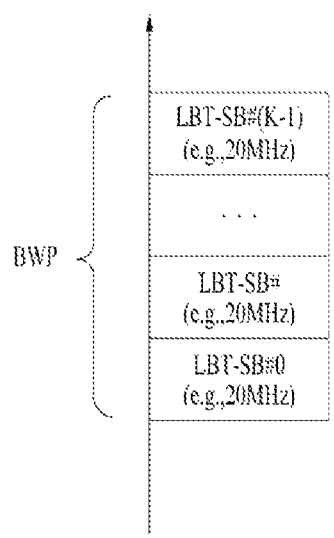
FIG. 9 is a diagram showing an example of the case in which a plurality of LBT-SBs is included in an unlicensed band to which various embodiments are applicable.

FIG. 9 is a diagram showing an example of the case in which a plurality of LBT-SBs is included in an unlicensed band to which various embodiments are applicable.

Referring to FIG. 9, a BWP of a cell (or a carrier) may include a plurality of LBT-SBs. The LBT-SB may have, for example, a band of 20 MHz. The LBT-SB may include a plurality of consecutive (P)RBs in the frequency domain and may be referred to as a (P)RB set. Although not shown, a guard band (GB) may be contained between LBT-SBs. Thus, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, an LBT-SB/RB index may be configured/defined to increase toward a high frequency band from a low frequency band.

Downlink Signal Transmission Method Through Unlicensed Band

A BS may perform one channel access procedure (CAP) of the following methods for DL signal transmission in an unlicensed band.

(1) Type 1 DL CAP Method

The length of a time duration spanned by a sensing slot that is sensed to be idle before transmission(s) in Type 1 DL CAP may be random. Type 1 DL CAP may be applied to the following transmission.

Transmission(s) initiated by a BS, including (i) a unicast PDSCH having user plane data, or (ii) a unicast PDSCH having user plane data and a unicast PDCCH for scheduling user plane data, or, Transmission(s) initiated by a BS, having i) a discovery burst only, or (ii) non-unicast information and a multiplexed discovery burst.

Figure 10:
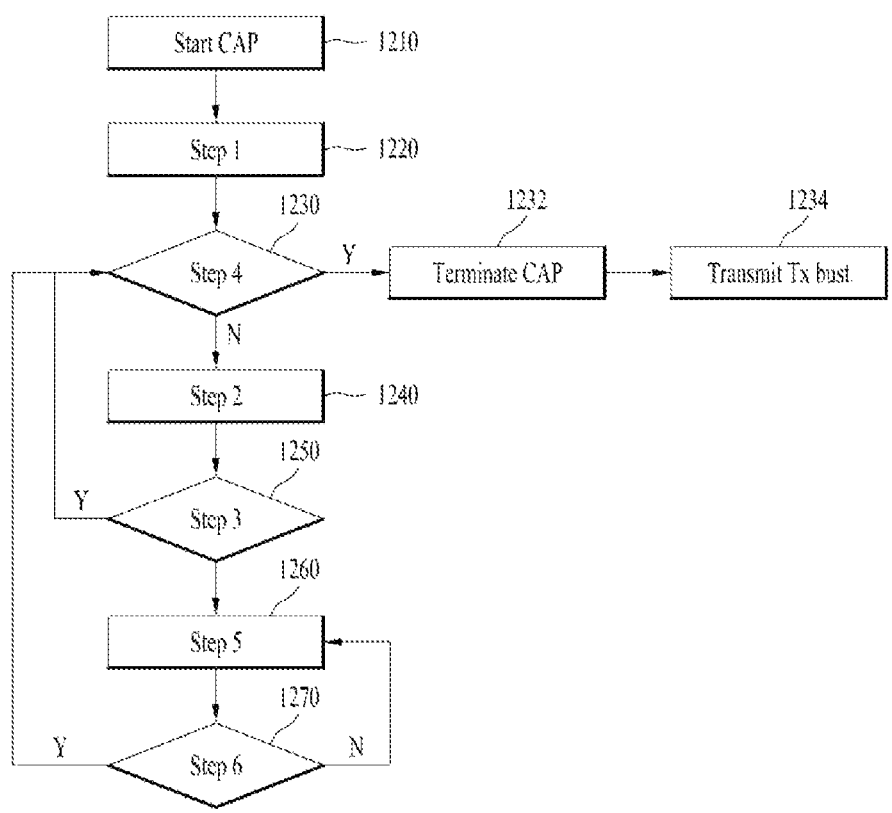
FIG. 10 is a flowchart of a CAP operation for DL signal transmission through an unlicensed band to which various embodiments are applicable.

FIG. 10 is a flowchart of a CAP operation for DL signal transmission through an unlicensed band to which various embodiments are applicable.

Referring to FIG. 10, for DL transmission, a transmission node (e.g., a BS) may initiate a channel access procedure (CAP) (1210).

A BS may sense a channel to be in an idle state for a sensing slot duration of a defer duration Td, and then when a counter N is 0, the BS may perform transmission (1234). In this case, the counter N may be adjusted by sensing a channel during additional sensing slot duration(s) according to the following procedure:

Step 1) (1220) N=$N_{init}$ may be set. Here, $N_{init}$ may be a random value that is evenly distributed between 0 and $CW_p$. Then, the procedure may proceed to Step 4.

Step 2) (1240) When N>0 and a BS selects to reduce the counter, N=N−1 may be set.

Step 3) (1250) A channel may be sensed during an additional sensing slot duration. In this case, when the additional sensing slot duration is idle (Y), the procedure may proceed to Step 4. Otherwise (N), the procedure may proceed to Step 5.

Step 4) (1230) When N=0 (Y), the CAP procedure may be terminated (1232). Otherwise (N), the procedure may proceed to Step 2.

Step 5) (1260) A channel may be sensed until a busy sensing slot is detected within an additional defer duration $T_d$ or all sensing slots within the additional defer duration $T_d$ are detected to be idle.

Step 6) (1270) When a channel is sensed to be idle during all sensing slot durations of the additional defer duration $T_d$ (Y), the procedure may proceed to Step 4. Otherwise (N), the procedure may proceed to Step 5.

As seen from Table 11, $m_p$, Minimum Contention Window (CW), Maximum CW, Maximum Channel Occupancy Time (MCOT), and allowed CW sizes, which are applied to the CAP, may be changed according to a channel access priority class.

TABLE 10

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {2,15} |
| 3 | 3 | 15 | 63 | 8 or 10 ms | {15,31,63} |
| 4 | 7 | 15 | 1023 | 8 or 10 ms | {15,31,63,127, 255,511,1023} |

The defer duration $T_d$ may be configured with duration $T_f$ (16 us)+mp consecutive sensing slot durations $T_{sl}$ (9 us) in the stated order. $T_f$ may include a sensing slot duration $T_{sl}$ at a starting point of a duration of 16 us.

$CW_{min,p} \leq CW_p \leq CW_{max,p}$. $CW_p$ may be set to $CW_p = CW_{min,p}$ and may be updated prior to Step 1 based on HARQ-ACK feedback (e.g., an ACK or NACK ratio) for a previous DL burst (e.g., a PDSCH) (CW size update). For example, $CW_p$ may be initialized to $CW_{min,p}$, may be increased to a next highest allowed value, or may be maintained as an original value, based on HARQ-ACK feedback for a previous DL burst.

(2) Type 2 DL CAP Method

The length of a time duration spanned by a sensing slot that is sensed to be idle before transmission (s) in Type 2 DL CAP may be deterministic. Type 2 DL CAP may be classified into Type 2A/2B/2C DL CAP.

Type 2A DL CAP may be applied to the following transmission. In Type 2A DL CAP, a BS may perform transmission immediately after a channel is sensed to be idle during at least a sensing duration $T_{short\_dl}$=25 us. Here, $T_{short\_dl}$ may include a duration $T_f$(=16 us) and one sensing slot duration immediately following the same. $T_f$ may include a sensing slot at a starting point of a duration.

(i) Transmission(s) initiated by a BS, having i) a discovery burst only, or (ii) non-unicast information and a multiplexed discovery burst, or Transmission(s) of a BS after a gap of 25 us from transmission (s) by a UE within shared channel occupancy.

Type 2B DL CAP may be applicable to transmission(s) by a BS after a gap of 16 us from transmission (s) by a UE within a Shared Channel Occupancy Time. In Type 2B DL CAP, the BS may perform transmission immediately after a channel is sensed to be idle during Tf=16 us. Tf may include a sensing slot within 9 us from the last of a duration. Type 2C DL CAP may be applicable to transmission(s) performed by a UE after the maximum gap of 16 us from transmission(s) by a UE within the Shared Channel Occupancy Time. In Type 2C DL CAP, a BS may not sense a channel before transmission.

3. VARIOUS EMBODIMENTS

A detailed description will be given of various embodiments based on the above technical ideas. The afore-described contents of clause 1 and clause 2 are applicable to various embodiments described below. For example, operations, functions, terminologies, and so on which are not defined in various embodiments may be performed and described based on clause 1 and clause 2.

Symbols/abbreviations/terms used in the description of various embodiments may be defined as follows.

A/B/C: A and/or B and/or C

Rate-matching: When a data symbol is rate-matched, for example, when a BS performs RE/RB mapping of a PDSCH, etc., it may be assumed that the PDSCH, etc. are not transmitted at the beginning in the RE/RB to be rate-matched, and RE/RB mapping may be performed. For example, a UE may assume the aforementioned transmission operation and may perform decoding of the PDSCH, etc. That is, for example, the UE may assume that the PDSCH, etc. are not mapped at the beginning in the rate-matched RE/RB and may perform decoding of the PDSCH, etc. For example, a rate-matching pattern in which a specific RE/RB is not used may be promised between the BS and the UE and/or may also be indicated/configured to the UE from the BS.

RB: resource block (PRB: physical RB)

RE: resource element

SSB: synchronization signal block

SS/PBCH: synchronization signal/physical broadcast channel

In the description of various embodiments, the expression "greater than/above A" may be replaced by the expression "above/greater than A".

In the description of various embodiments, the expression "less than/below B" may be replaced by the expression "below/less than B".

As more communication devices require larger communication capacity, efficient use of limited frequency bands has become an important requirement. Thus, a cellular communication system such as a 3GPP LTE/NR system has considered using an unlicensed band such as a 2.4 GHz band that is mainly used by an existing WiFi system or a newly emerging unlicensed band such as a 5 GHz and/or 60 GHz band in traffic offloading. In the description of various embodiments, the term "unlicensed band" may be replaced by the terms "unlicensed spectrum" and "shared spectrum".

The UE or the BS may use a method of wireless transmission and reception through contention between communication nodes for signal transmission in an unlicensed band. That is, in order to transmit a signal through the unlicensed band, each communication node may perform channel sensing prior to signal transmission to check that another communication node does not perform signal transmission in the unlicensed band. Hereinafter, for convenience of description, such an operation may be defined as a listen before talk (LBT) or a channel access procedure (CAP). In particular, the operation of checking whether another communication node performs signal transmission may be defined as carrier sensing (CS) and the case in which another communication node is determined not to perform signal transmission is defined as the case in which clear channel assessment (CCA) is checked.

An eNB/gNB or a UE of an LTE/NR system to which various embodiments are applicable may also need to perform LBT or CAP for signal transmission in an unlicensed band. In other words, the eNB/gNB or the UE may perform signal transmission through the unlicensed band using the CAP or may perform signal transmission through the unlicensed band based on the CAP.

When the eNB/gNB or the UE transmits a signal through the unlicensed band, other communication nodes of WiFi, etc. may also perform the CAP to prevent interference. For example, in the WiFi standard (e.g., 801.11ac), a CCA threshold may be specified as −62 dBm for a non-WiFi signal and may be specified as −82 dBm for a WiFi signal. Thus, when receiving, for example, a signal other than the WiFi signal with power of −62 dBm or greater, the STA or the AP that operates based on the WiFi standard may not transmit a signal to prevent interference.

In the following description of various embodiments of the present disclosure, when the BS succeeds in the CAP, it may mean that the unlicensed band is determined to be in an idle state and the BS starts signal transmission through the unlicensed band at a specific time point. In contrast, when the BS fails in the CAP, it may mean that the unlicensed band is determined to be in a busy state and the BS is not capable of starting signal transmission through the unlicensed band at a specific time point.

In an NR system, transmission and reception of one or more SS/PBCH blocks may be supported. Each SS/PBCH block may correspond to a specific index. Sequence information in the SS/PBCH block and/or an index of a corresponding SS/PBCH block in a loaded payload (including a scrambling sequence) may be known. Thus, when the UE knows the index through corresponding information in the SS/PBCH block in an initial access process, the UE may recognize a time axis boundary and/or index of a frame/subframe/slot through a relationship between a predefined SS/PBCH block index and the time axis boundary of the frame/subframe/slot and may also recognize the index of the frame/subframe/slot via combination with other information in the SS/PBCH block.

For mobility support, UEs needs to perform neighbor (and/or serving) cell radio resource management/radio link monitoring (RRM/RLM) measurement, and when performing measurement for each SS/PBCH block of a neighbor cell, the UEs may also require corresponding index information.

However, in a random access-based shared spectrum, transmission may be attempted only when the CAP prior to transmission is successful, and thus, an SS/PBCH block to be transmitted by the BS may not be transmitted at a predetermined time point. In this case, when the SS/PBCH block (transmission) itself is dropped, a time taken to camp on a cell may be increased in the case of UEs that attempt initial access, and a time taken to obtain a significant measurement result may be increased in the case of UEs that attempt measurement of a serving/neighbor cell.

Considering that the CAP fails, etc., a time at which the BS succeeds in the CAP and starts transmitting the SS/PBCH block may not be known in terms of a method of increasing the number of transmission occasions of the SS/PBCH block and/or a UE that receives the SS/PBCH block, and thus a method of resolving ambiguity that occurs in this case may have been proposed and may be divided into broad categories as follows:

1) Method of providing information in PBCH payload
2) Method of providing delay information in specific sequence The advantages and disadvantages of methods 1) and 2) may be summarized as follows.

In the method 1), when the reliability of transferred information is high but there is a burden of obtaining information by performing PBCH decoding at a receiving end (a complexity problem) and multi-cell interference, there is a problem in that a long is required to obtain information due to degradation of PBCH decoding performance.

In contrast, in the method 2), transmission time information needs to be obtained via sequence detection, and thus there may be an advantage in that performance is excellent compared with PBCH decoding performance and implementation of a UE is relatively simple.

For example, when comparing the amount of transferred information, a PBCH payload may include various pieces of information on a system as well as transmission delay time information, and a sequence may transfer limited information including the transmission delay time information. In addition, PBCH decoding performance may be degraded due to channel estimation performance degradation in a multi-cell interference environment, and sequence detection may be excellent compared with the performance.

For example, when a delay position due to the CAP is represented by a sequence, a sequence may be required as much as the delay position. For example, when delay time information represented in M (M being a natural number) expressions as additional information is included and transmitted in a sequence used to transmit other existing information, a sequence of M times the number of N (N being a natural number) sequences previously used may be required, resulting in a total of N*M sequences being used. In other words, a sequence may be required as many as a multiple of the number of added information, and the receiving end may have a burden of detecting signals M times or more. For example, 8 different PBCH DMRS sequences may be used for each specific cell identifier (ID), and in this regard, M pieces of time delay information due to the CAP is transferred using a PBCH DMRS sequence, a total of 8*M sequences need to be used.

The BS may succeed in the CAP to transfer information corresponding to a point at which SS/PBCH block is transmitted. For example, when a candidate position at which a specific SS/PBCH block is to be transmitted is determined, the BS may inform the UE of information containing the candidate position.

For example, when time and frequency resources of an SSB transmitted by the BS overlap with a PDCCH/PDSCH, etc. for transmission of the BS, a symbol may be mapped to other Res except for a resource element (RE) for the SSB included in the PDCCH/PDSCH, etc. For example, when receiving a DL signal and detecting a symbol from the PDCCH/PDSCH, the UE may attempt symbol detection from other REs except for the RE for the SSB. To this end, a rate-matching pattern in which a specific RE is not used may be promised between a transmitting end (e.g., a BS) and a receiving end (e.g., a UE) and/or the transmitting end may indicate/configure (the rate-matching pattern) to the receiving end.

For example, the maximum of 4/8/64 SSBs may be transmitted and received according to an SCS, but in an actual wireless communication system, the maximum of SSBs or less (i.e., 4 or less/8 or less/64 or less in each SCS) may be transmitted and received. Thus, for example, the UE needs to know the number of SSBs that are actually transmitted and received to and from the BS, and the BS may notify the UE of information on the actually transmitted SSB. For example, this information may be defined as actually transmitted synchronization signal block (ATSS) information. For example, the ATSS information may be transmitted and received from a ssb-PositionsInBurst information element (IE). For example, rate matching and/or SSB-to-RO mapping may be based on the ATSS.

For example, in the case of the SSB, when SSBs used in actual transmission among SSBs to be transmitted are indicated to the UE from the BS (through an SIB1 and a UE-specific RRC signal), the UE may rate-match all REs in which SSBs used in actual transmission are used and may attempt symbol detection.

In an NR-U to which various embodiments are applicable, in consideration of the CAP, a plurality of candidate positions at which a specific SSB is to be transmitted may be configured, and when the CAP is successful, the BS may transmit the SSB using a resource at the nearest location. For example, in this case, when the SSB is transmitted from any resource among the resources configured as the candidate position, the BS may not transmit the SSB at another candidate position afterwards. For example, when receiving a specific SSB at the configured candidate position, the UE may expect that the SSB is not transmitted from another candidate resource configured for the SSB.

However, for example, in a shared spectrum based on random access, because channel access through CAP attempt is premised, the CAP may be successful at any resource position, and thus it may not be ensured at which position the SSB is transmitted. In this case, it may be ambiguous at which candidate position the UE needs to rate-match REs for the SSB, and thus there may be a need for a solution for this.

Various embodiments may relate to an SS/PBCH transmission and reception method in a shared spectrum.

Various embodiments may relate to an SS/PBCH block transmitting method when the CAP for the SS/PBCH block is not successful in a shared spectrum, measurement of the UE in consideration of the transmitting method, and/or an index/boundary acquiring method of a frame/subframe/slot of the UE.

Various embodiments may relate to a rate-matching method of a control channel/data channel in a shared spectrum.

Figure 11:
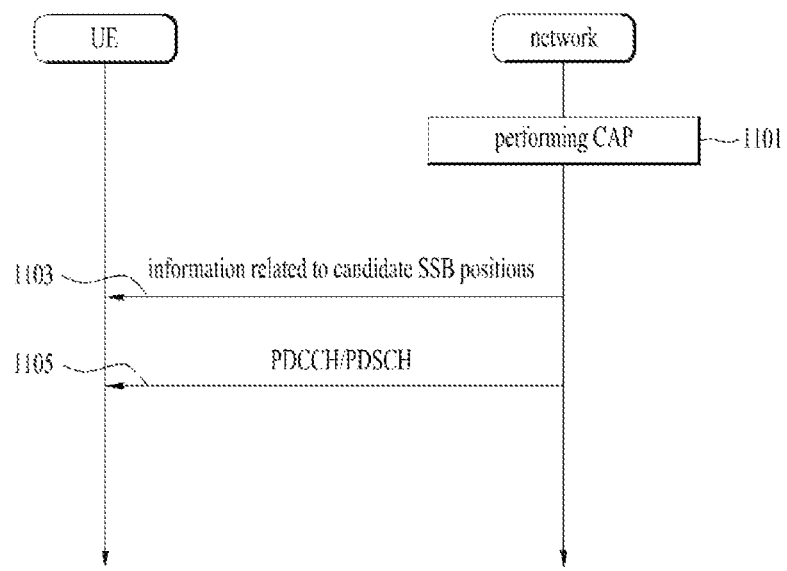
FIG. 11 is a schematic diagram showing an operating method of a UE and a network according to various embodiments.

FIG. 11 is a schematic diagram showing an operating method of a UE and a network according to various embodiments.

Figure 12:
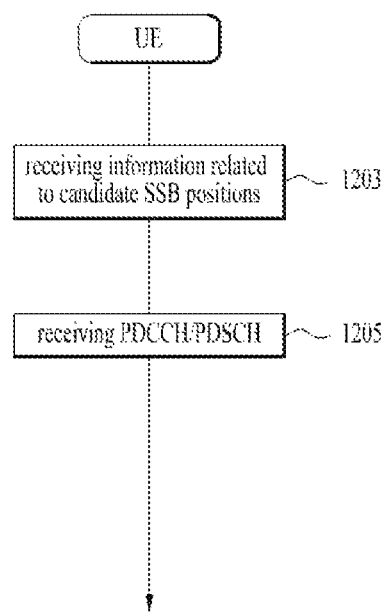
FIG. 12 is a flowchart showing an operating method of a UE according to various embodiments.

FIG. 12 is a flowchart showing an operating method of a UE according to various embodiments.

Figure 13:
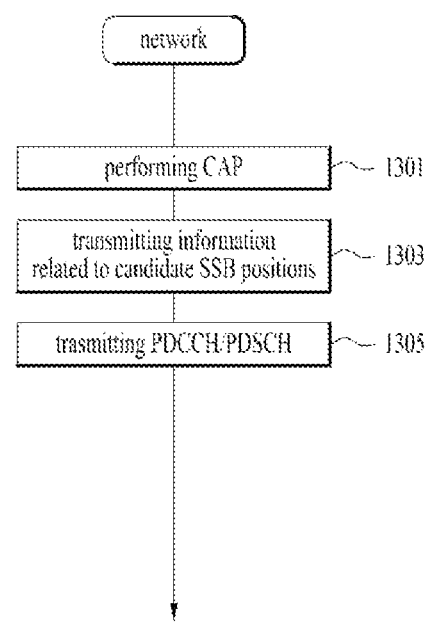
FIG. 13 is a flowchart showing an operating method of a network according to various embodiments.

FIG. 13 is a flowchart showing an operating method of a network according to various embodiments.

For example, the UE and/or the network may be one or more of apparatuses according to various embodiments to be described below in Section 4.

Referring to FIGS. 11 to 13, in operations 1101 and 1201 according to various embodiments, the network (e.g., a BS) may perform a CAP. For example, the CAP may be for access to a channel in a shared spectrum for transmission.

In operations 1103, 1203, and 1303 according to various embodiments, the network may transmit information related to a candidate SSB position, and the UE may receive the information. For example, transmission of information related to a candidate SSB position may be based on the CAP. For example, the network may transmit information related to the candidate SSB position based on whether the CAP is successful.

In operations 1105, 1205, and 1305 according to various embodiments, the network may transmit a PDCCH/PDSCH and the UE may receive the same. For example, transmission and reception of the PDCCH/PDSCH may be related to information related to the candidate SSB position and/or may be performed based on information related to the candidate SSB position. For example, the network may perform rate-matching based on one or more SSB candidate positions among the SSB candidate positions to transmit the PDCCH/PDSCH, and the UE may perform rate-matching based on one or more SSB candidate positions among the SSB candidate positions to receive the PDCCH/PDSCH.

Hereinafter, various embodiments of the present disclosure will be described in detail. The various embodiments of the present disclosure described below may be combined in whole or in part to constitute other various embodiments of the present disclosure unless mutually exclusive, which will be obvious to those of ordinary skill in the art.

3.1. Method 1

According to various embodiments, a UE/BS may perform rate-matching on REs of candidate positions at which an SSB is to be transmitted and received.

Embodiment 1

According to various embodiments, when the SSB is received in a specific range and the SSB is periodically received rather than being received in a specific range, the UE may rate-match REs at all candidate positions at which the SSB is to be received in a specific range.

According to various embodiments, when the SSB is transmitted in a specific range and the SSB is periodically transmitted rather than being transmitted in a specific range, the BS may rate-match REs at all candidate positions at which the SSB is to be transmitted in a specific range.

Embodiment 2

According to various embodiments, in detail, when candidate positions at which the SSB is to be transmitted is configured within N ms (e.g., 5 ms or a half frame) and a duration M ms/N ms are repeated at a period of M ms (e.g., M=5, 10, 20, 40, 80, and 160), REs at all SSB transmission candidate positions within a duration M ms/N ms may be rate-matched.

According to various embodiments, transmission candidate SSBs may be indicated by a bitmap and/or a specific indicator, and REs at candidate positions at which transmission candidate SSBs are to be transmitted in a duration M ms/N ms may be rate-matched.

And/or, according to various embodiments, rate-matching may not be performed in a duration other than the duration M ms/N ms.

Embodiment 3

According to various embodiments, like in Embodiment, 2, when candidate resources in which transmission candidates SSBs are to be transmitted within N ms are indicated, the BS configures a time duration (e.g., K ms, K being an integer equal to or greater than 0/a real number equal to or greater than 0) for discovery to the UE, SSB transmission durations of the configured discovery window and the serving cell overlap with each other, and K is configured to be less than N, rate-matching may be performed on REs of candidate resources of transmission candidate SSBs of a serving cell included in a duration configured depending on K.

Embodiment 4

According to various embodiments, when a transmission candidate SSB is configured as 1, the number of candidate resources in one slot is configured as L (L being a integer/natural number equal to or greater than 0, e.g., L=2), and SSB candidate resources are included in a PDSCH resource transmitted and received through a PDCCH, rate-matching may be performed only on one specific resource among SSB transmission candidate resources in the PDSCH, and rate-matching may not be performed in the remaining SSB transmission candidate resources.

Embodiment 5

According to various embodiments, similarly to Embodiment 4, when two transmission candidates SSB having consecutive indexes are configured to be used and a PDSCH resource is indicated/configured over S (S being an integer/natural number equal to or greater than 0) slots, rate-matching may be performed only in 2 specific resources among the transmission candidate resources, and rate-matching may not be performed in the remaining resources.

3.2. Method 2

According to various embodiments, the UE may perform rate-matching according to indication of the BS.

Embodiment 1

According to various embodiments, control information may include information indicating whether to perform rate-matching. According to various embodiments, as necessary, whether to perform rate-matching may be indicated to the UE.

For example, the DCI may include an indicator for SSB rate-matching. For example, based on the indicator, whether to perform rate-matching may be indicated.

For example, when the indicator has 1 bit, RE resources at SSB candidate positions in a resource allocated according to a corresponding 1 bit value may or may not be rate-matched.

For example, when the indicator has 2 bits, 2 bits may indicate whether to perform rate-matching with a bitmap.

For example, when the indicator has 2 bits, if two SSB candidate positions are included in an allocated resource, a value of the indicator may be mapped as follows and/or the value of the indicator may be indicated as follows.

00: Rate-matching is not performed
10: Rate-matching is performed on a resource at a first position for an SSB
01: Rate-matching is performed on a resource at a second position for an SSB
11: Rate-matching is performed on all SSB transmission candidate resources For example, a UE that receives the indicator may perform rate-matching according to the indicator.

According to the aforementioned various embodiments (including both of 3.1 and 3.2), a rate-matched resource may correspond to REs in which the SSB is transmitted and all REs included in OFDM symbols (which may or may not include an SSB signal). According to various embodiments, rate-matching may be performed in units of RBs.

For example, when the SSB is included in a specific RB, all of an RE that includes the SSB among REs included in the specific RB and an RE that does not include the SSB among the REs including the specific RB may be rate-matched.

According to various embodiments, when a starting point of the RB for the SSB and a starting point of the RB of the BWP are different from each other, even if SSBs are positioned in some REs of the RB of the BWP, all REs of the corresponding RB may be a target of rate-matching.

And/or, According to various embodiments, when rate-matching is performed only on an OFDM symbol including the SSB but the SSB is included in the PDCCH/PDSCH resource, REs at the same frequency location (RB range) in an adjacent OFDM symbol in which the SSB is not transmitted as well as in all OFDM symbols including RBs of a BWP in which the SSB is transmitted may be a target of rate-matching.

In the case of a shared spectrum channel access operation to which various embodiments are applicable, the UE may assume that SSB transmission in a half-frame is present in a discovery burst transmission window that starts from a first symbol of a first slot in the half-frame.

For example, the UE may receive a discovery burst transmission window duration for each serving cell.

For example, when the discovery burst transmission window duration is not provided, the UE may consider the discovery burst transmission window duration as a half-frame.

For example, for each serving cell, the UE may assume that a repetition period of the discovery burst transmission window is the same as a repetition period of a half-frame for SSB reception.

For example, the UE may assume that SSB(s) having the same ($N_{DM-RS}^{PBCH}$ mod $N_{SSB}^{QCL}$) value have a QCL relationship in the same discovery burst transmission window or over different discovery burst transmission windows among SSBs of a serving cell. For example, $N_{DM-RS}^{PBCH}$ may indicate a DM-RS sequence index of a PBCH of a SSB, and $N_{SSB}^{QCL}$ may be (i) provided from ssbPositionQCL-Relationship or may be (ii) acquired based on Table 11 below when the ssbPositionQCL-Relationship is not provided.

TABLE 11

| subCarrier-SpacingCommon | LSB of ssb-SubcarrierOffset | $N_{SSB}^{QCL}$ |
| --- | --- | --- |
| scs15or60 | 0 | 1 |
| scs15or60 | 1 | 2 |
| scs30or120 | 0 | 4 |
| scs30or120 | 1 | 8 |

For example, ssbSubcarrierSpacingCommon may indicate an SCS of RMSI only in case of "operation without shared spectrum". For example, the UE may assume that the number of SSBs transmitted on a serving cell within the discovery burst transmission window is not greater than $N_{SSB}^{QCL}$. For example, the UE may determine an SSB index according to ($N_{DM-RS}^{PBCH}$ mod $N_{SSB}^{QCL}$) or ($\bar{\iota}$ mod $N_{SSB}^{QCL}$). For example, $\bar{\iota}$ may indicate a candidate SSB index. Thus, for example, one or more candidate SSBs may correspond to one SSB index. Candidate SSBs corresponding to the same SSB index may be QCL.

According to the aforementioned various embodiments (including both of 3.1 and 3.2), SSBs having a QCL relationship may be indicated according to Q. For example, Q may be understood to be related to an interval between candidate SSBs having a QCL relationship and to be the same as the aforementioned $N_{SSB}^{QCL}$. For example, in the case of Q=1, all candidate SSBs may be assumed to have a QCL relationship. For example, in the case of Q=2, QCL may not be assumed between adjacent SSBs, and candidate SSBs spaced apart from each other by two indexes may be assumed to have a QCL relationship.

According to various embodiments, in N bits of an indicator N indicated by the transmission candidate SSB, Q bits (Q=<N) thereof may be interpreted to be a valid value.

And/or, according to various embodiments, in N bits, the indicator N may be repeated and indicated by Q bits.

And/or, according to various embodiments, an indicator indicating a transmission candidate SSB may be configured with Q bits.

For example, when Q=4 and N=8, if N bits of the transmission candidate indicator are configured with '11000000', only the first 4 bits, '1100', may be valid. For example, in Embodiment 2 of Method 1 according to various embodiments, a candidate position at which an SSB is to be transmitted within a window of 5 ms at a period of 20 ms may be interpreted to be '1100110011' by expanding 4-bit information of corresponding '1100' based on an SCS of 30 kHz by the UE, 2 bits may correspond to 1 slot, rate-matching may be performed at a position '1', and rate-matching may not be performed at a position '0'.

3.3. Example of Various Embodiment

Hereinafter, more detailed examples of the aforementioned various embodiments (including both 3.1 and 3.2) will be described. The following example of various embodiments may be a more detailed example of the aforementioned various embodiments (including both 3.1 and 3.2) and is not limited to various embodiments.

Embodiment 1

Figure 14:
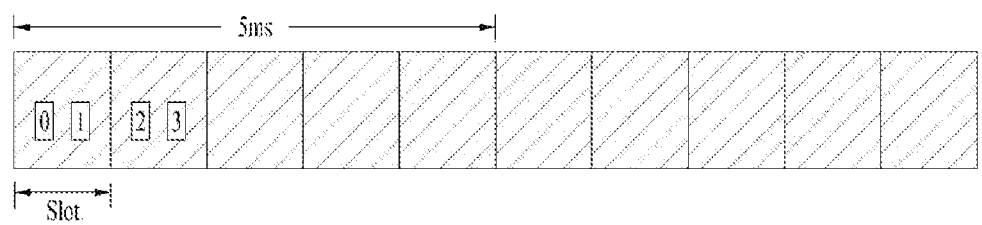
FIG. 14 is a diagram showing an example of an ATSS indication method to which various embodiments are applicable.
Figure 14:
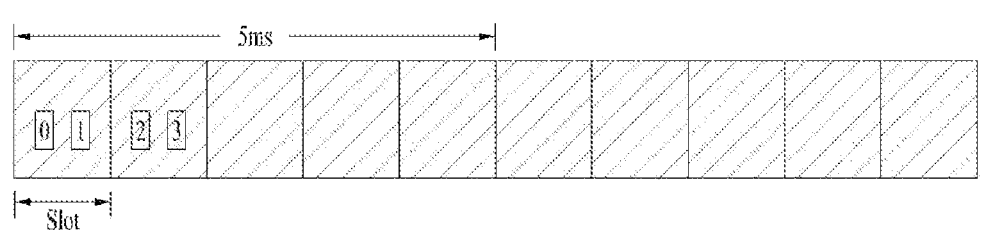

FIG. 14 is a diagram showing an example of an ATSS indication method to which various embodiments are applicable. FIG. 14 illustrates an example of the case in which a candidate position for SSB transmission and reception within a licensed band is configured.

Referring to FIG. 14, for example, a candidate position for SSB transmission and reception may be configured in a 5 ms duration including 5 slots. For example, one slot may include 2 candidate positions. For example, as exemplified in FIG. 14, when 4 candidate positions are configured, respective candidate positions may sequentially correspond to indexes of 0, 1, 2, and 3.

For example, ssb-PositionsInBurst may indicate an ATSS at the candidate position in a bitmap. For example, when the ssb-PositionsInBurst is configured with '1100', candidate position #0 (and/or SSB #0) and candidate position #1 (and/or SSB #1) may be ATSSs, which may correspond to the case in which an SSB is not transmitted and received at candidate position #2 and candidate position #3 (and/or SSB #2 and SSB #3 are not transmitted and received).

For example, rate-matching may be performed in a resource region in which an ATSS and PDSCH resource allocation overlap with each other. For example, rate-matching may be performed in a resource region in which candidate position #0 (and/or SSB #0) and candidate position #1 (and/or SSB #1) overlap with PDSCH resource allocation. For example, rate-matching may not be performed in a resource region in which candidate position #2 and candidate position #3 overlap with PDSCH resource allocation.

Figure 15:
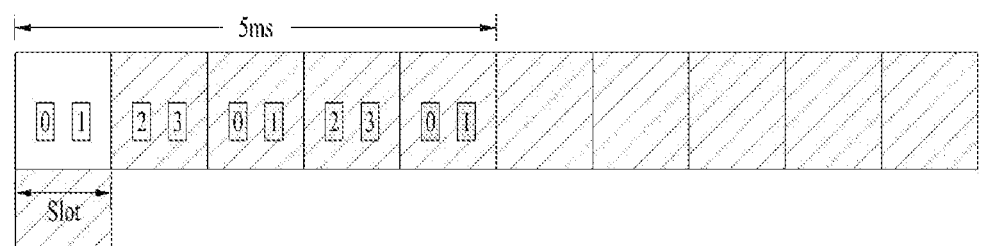
FIG. 15 is a diagram showing an example of an ATSS indication method to which various embodiments are applicable.
Figure 15:
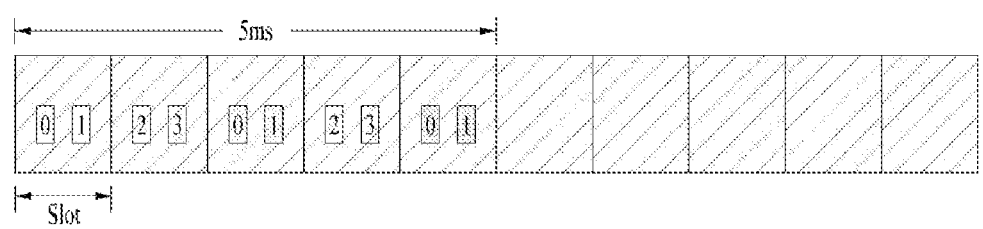

FIG. 15 is a diagram showing an example of an ATSS indication method to which various embodiments are applicable. FIG. 15 is a diagram showing an example of the case in which a candidate position for SSB transmission and reception is configured in a shared spectrum.

Referring to FIG. 15, for example, a candidate position for SSB transmission and reception may be configured in a 5 ms duration including 5 slots. For example, one slot may include 2 candidate positions. For example, candidate positions having a QCL relationship may correspond to the same index. For example, as exemplified in FIG. 15, when 10 candidate positions are configured and Q=4, respective candidate positions may sequentially correspond to indexes of 0, 1, 2, 3, 0, 1, 2, 3, 0, and 1.

For example, ssb-PositionsInBurst may indicate an ATSS at the candidate position in a bitmap. For example, when the ssb-PositionsInBurst is configured with '1100', candidate position #0 (and/or SSB #0) and candidate position #1 (and/or SSB #1) (which are included in the first slot within 5 ms) may be ATSSs, which may correspond to the case in which an SSB is not transmitted and received at candidate position #2 and candidate position #3 (which are included in the second slot within 5 ms) (and/or SSB #2 and SSB #3 are not transmitted and received).

For example, rate-matching may be performed in an ATSS, and a resource region in which a candidate position having a QCL relationship with the ATSS and PDSCH resource allocation overlap with each other. For example, rate-matching may be performed in the resource region in which all candidate positions corresponding to indexes 0 and 1 of the ATSS and PDSCH resource allocation overlap with each other as well as in the ATSS. For example, rate-matching may not be performed in a resource region in which all candidate positions corresponding to indexes 2 and 3 and PDSCH resource allocation overlap with each other.

According to various embodiments, whether to perform rate-matching in the resource region in which one or more candidates among all candidate positions corresponding to indexes 0 and 1 of the ATSS overlap with PDSCH resource allocation may be further indicated. In this case, according to various embodiments, rate-matching may be performed in a resource region in which remaining candidate positions except for one or more candidate positions indicating that rate-matching is not performed among all candidate positions corresponding to indexes 0 and 1 of the ATSS (i.e., indicating that it is possible to transmit and receive a PDSCH) overlap with PDSCH resource allocation.

Embodiment 2

Figure 16:
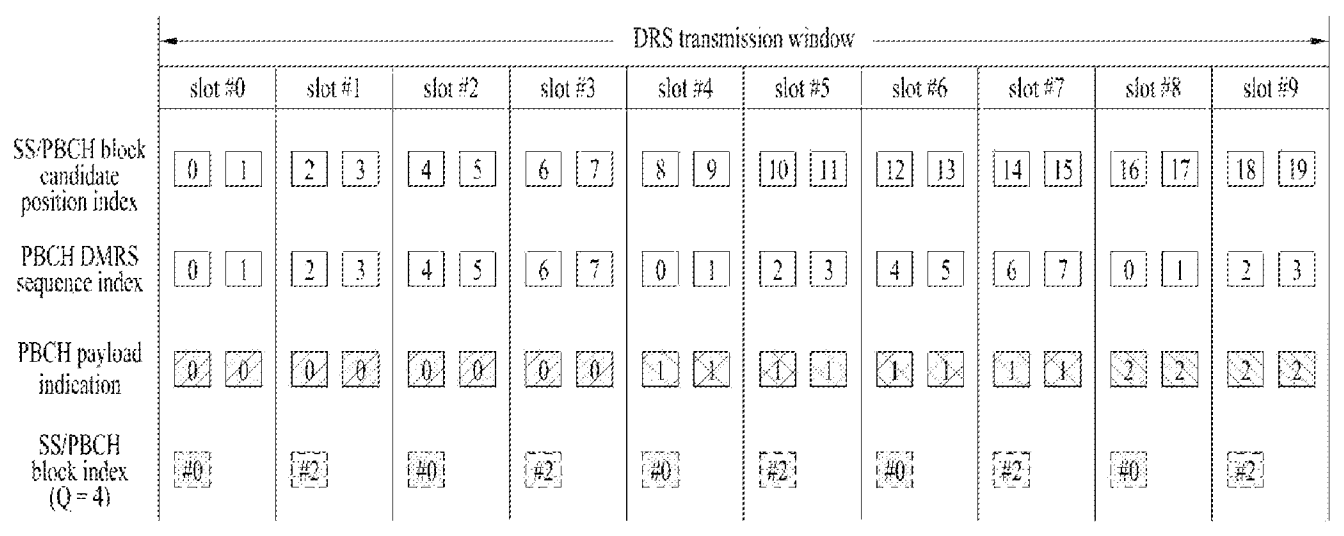

FIG. 16 is a diagram showing an example of an SSB candidate position according to various embodiments.

FIG. 16 illustrates an example of the case in which Q is 4 and ssb-PositionsInBurst is configured as '10100000'. In this case, only an SS/PBCH block (SSB), an SSB index of which is #0/#2, may be transmitted.

According to various embodiments, the ssb-PositionsInBurst and Q may be used to provide a rate-matching pattern within a discovery reference signal (DRS) transmission window (or a discovery burst transmission window). For example, the UE may perform rate-matching on all SSB candidate position indexes having a QCL relationship with an actually transmitted SSB index provided by the ssb-PositionsInBurst.

For example, the UE may perform rate-matching on a time/frequency resource of SSB candidate position indexes 0/2/4/6/8/10/12/14/16/18.

For example, when receiving a PDSCH scheduled by a PDCCH that is CRC-scrambled by C-RNTI, MCS-C-RNTI, CS-RNTI, RA-RNTI, MsbB-RNTI, P-RNTI, and TC-RNTI (or when a PDCCH is scrambled by a PDSCH SI-RNTI having an SPS (or having CRC) and a system information indicator in a PDCCH (i.e., DCI)), the UE may assume SSB transmission according to ssb-PositionsInBurst if PDSCH resource allocation overlaps with PRB PRB including an SSB transmission resource (e.g., SS/PBCH block candidate position indexes 0/2/4/6/8/10/12/14/16/18). That is, for example, the UE may assume that the PRB including the SSB transmission resource is not available in (i.e., is not mapped to) an OFDM symbol in which the SSB is transmitted.

Figure 17:
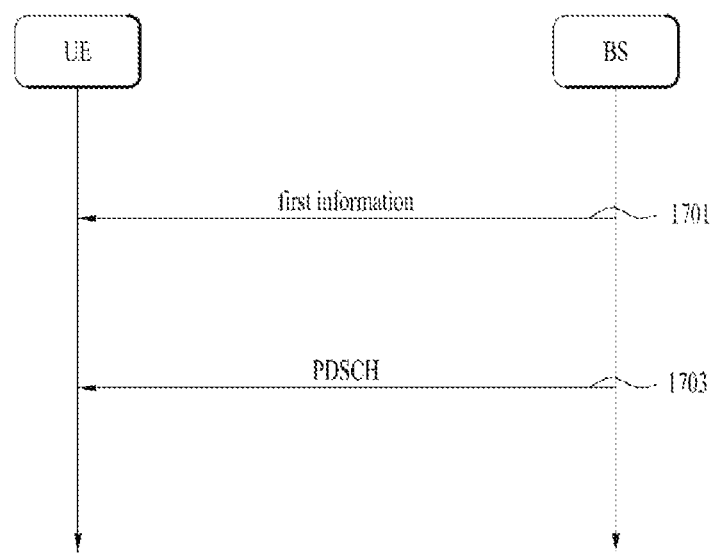
FIG. 17 is a schematic diagram showing an operating method of a UE and a BS according to various embodiments.

FIG. 17 is a schematic diagram showing an operating method of a UE and a BS according to various embodiments.

Figure 18:
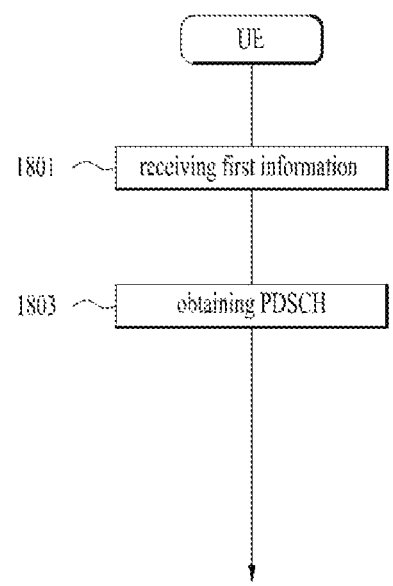
FIG. 18 is a flowchart showing an operating method of a UE according to various embodiments.

FIG. 18 is a flowchart showing an operating method of a UE according to various embodiments.

Figure 19:
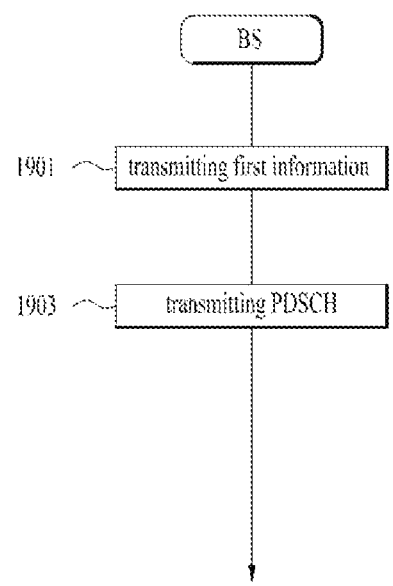
FIG. 19 is a flowchart showing an operating method of a BS according to various embodiments.

FIG. 19 is a flowchart showing an operating method of a BS according to various embodiments.

Referring to FIGS. 17 to 19, in operations 1701, 1801, and 1901 according to various embodiments, the BS may transmit first information and the UE may receive the first information.

According to various embodiments, the first information may be related to a time domain position of an SS/PBCH block (e.g., an ATSS) transmitted in a preconfigured time duration including a plurality of candidate SS/PBCH blocks.

In operations 1703, 1803, and 1903 according to various embodiments, the BS may transmit a PDSCH related to the first information, and the UE may obtain a PDSCH based on the first information.

According to various embodiments, a PDSCH may not be transmitted/obtained in a resource region in which PDSCH resource allocation related to the PDSCH overlaps with an SS/PBCH transmission resource.

According to various embodiments, the SS/PBCH transmission resource may be related to remaining candidate SS/PBCH blocks except for one or more candidate SS/PBCH blocks configured to obtain a PDSCH in a resource region that overlaps with PDSCH resource allocation among all candidate SS/PBCH blocks corresponding to a transmitted SS/PBCH block among a plurality of candidate SS/PBCH blocks.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 20 is a diagram illustrating devices that implement various embodiments.

Figure 20:
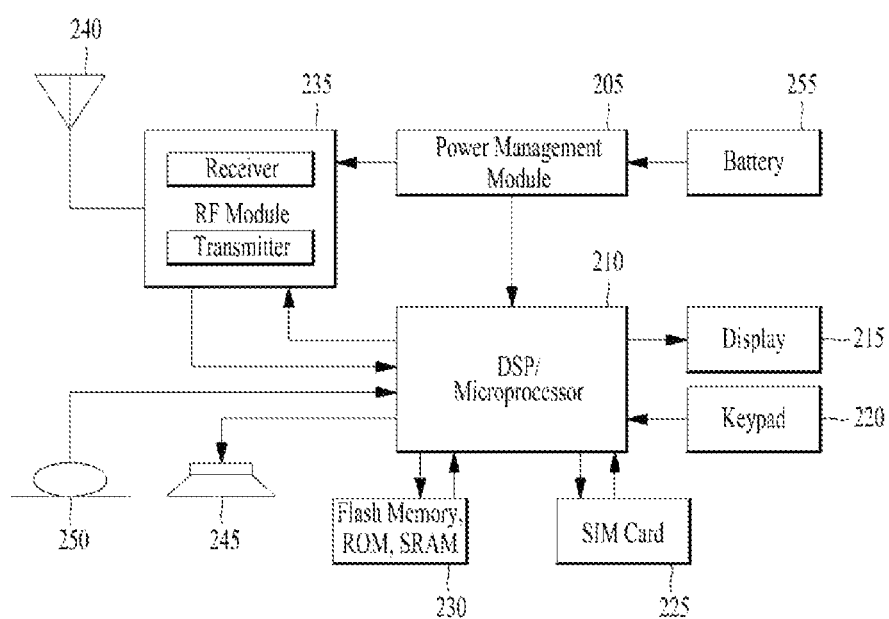
FIG. 20 is a block diagram illustrating an apparatus for implementing various embodiments.

The devices illustrated in FIG. 20 may be a UE and/or a BS (e.g., eNB or gNB) adapted to perform the aforedescribed mechanisms, or any devices performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments may operate as follows, while controlling a memory.

According to various embodiments, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments, one or more processors (or one or more processors of a communication device included in a UE) included in the UE may receive first information related to a time domain position of an SS/PBCH block (e.g., an ATSS) transmitted in a preconfigured time duration including a plurality of candidate SS/PBCH blocks.

According to various embodiments, one or more processors included in the UE may obtain a PDSCH based on the first information.

According to various embodiments, a PDSCH may not be acquired in a resource region in which PDSCH resource allocation related to the PDSCH and an SS/PBCH transmission resource overlap with each other.

According to various embodiments, the SS/PBCH transmission resource may be related to remaining candidate SS/PBCH blocks except for one or more candidate SS/PBCH blocks configured to obtain a PDSCH in a resource region that overlaps with PDSCH resource allocation among all candidate SS/PBCH blocks corresponding to a transmitted SS/PBCH block among a plurality of candidate SS/PBCH blocks.

According to various embodiments, one or more processors included in a BS (or one or more processors of a communication device included in the BS) may transmit first information related to a time domain position of a transmitted SS/PBCH block in a preconfigured time duration including a plurality of candidate SS/PBCH blocks.

According to various embodiments, one or more processors included in the BS may transmit a PDSCH related to the first information.

According to various embodiments, a PDSCH may not be transmitted in a resource region in which PDSCH resource allocation related to a PDSCH overlaps with an SS/PBCH transmission resource.

According to various embodiments, the SS/PBCH transmission resource may be related to remaining candidate SS/PBCH blocks except for one or more candidate SS/PBCH blocks configured to obtain a PDSCH in a resource region that overlaps with PDSCH resource allocation among all candidate SS/PBCH blocks corresponding to a transmitted SS/PBCH block among a plurality of candidate SS/PBCH blocks.

A more specific operation of a processor included in a BS and/or a UE according to various embodiments may be described and performed based on the afore-described clause 1 to clause 3.

Unless contradicting with each other, various embodiments may be implemented in combination. For example, the BS and/or the UE according to various embodiments may perform operations in combination of the embodiments of the afore-described clause 1 to clause 3, unless contradicting with each other.

4.2. Example of Communication System to which Various Embodiments are Applied

In the present specification, various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
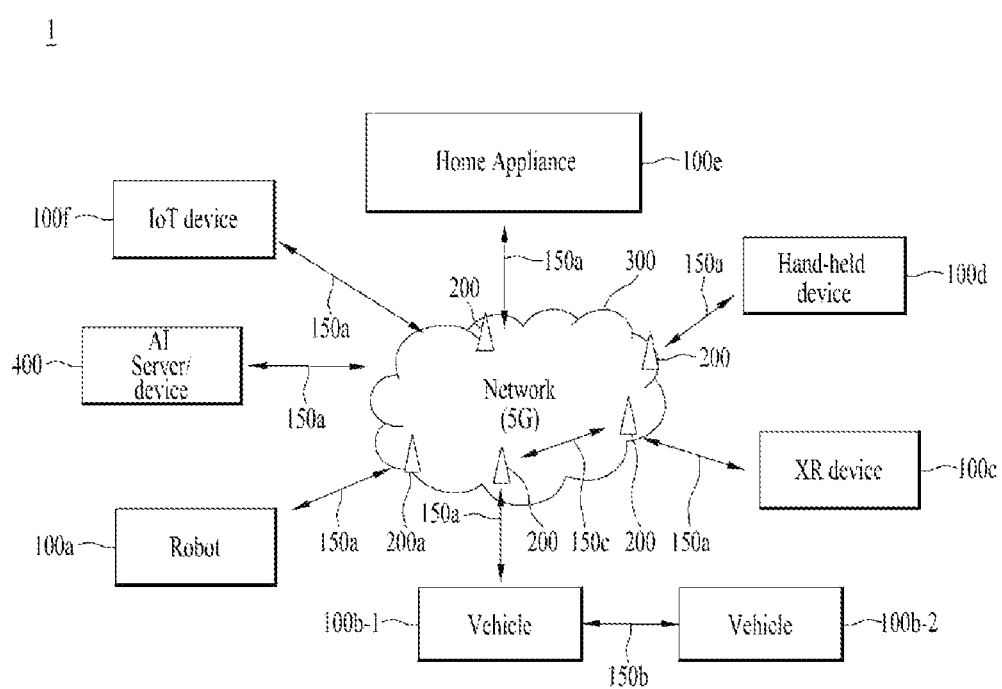
FIG. 21 illustrates an exemplary communication system to which various embodiments are applied.

FIG. 21 illustrates an exemplary communication system to which various embodiments are applied.

Referring to FIG. 21, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the Various embodiments.

4.2.1 Example of Wireless Devices to which Various Embodiments are Applied

Figure 22:
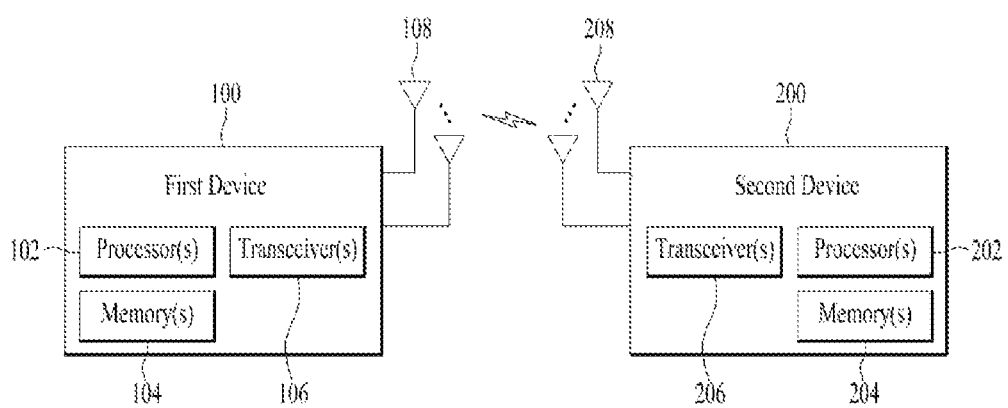
FIG. 22 illustrates exemplary wireless devices to which various embodiments are applicable.

FIG. 22 illustrates exemplary wireless devices to which various embodiments are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the present disclosure.

According to various embodiments, a computer-readable storage medium may store one or more instructions or computer programs which, when executed by one or more processors, cause the one or more processors to perform operations according to various embodiments or implementations of the present disclosure.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 23:
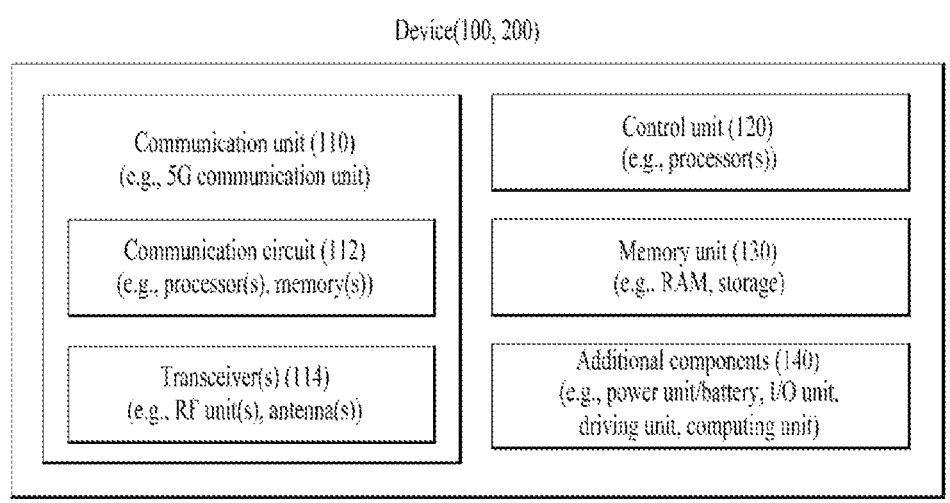
FIG. 23 illustrates other exemplary wireless devices to which various embodiments are applied.

4.2.2. Example of Using Wireless Devices to which Various Embodiments are Applied FIG. 23 illustrates other exemplary wireless devices to which various embodiments are applied. The wireless devices may be implemented in various forms according to a use case/service (see FIG. 21).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

4.2.3. Example of Portable Device to which Various Embodiments are Applied

Figure 24:
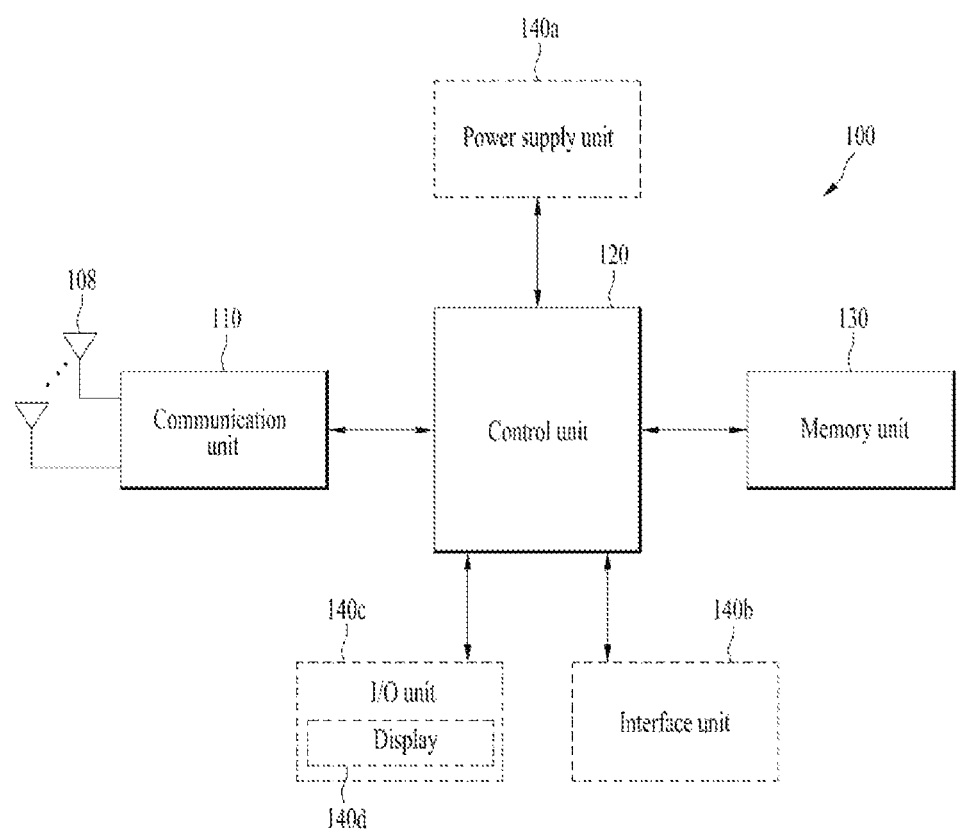
FIG. 24 illustrates an exemplary portable device to which various embodiments are applied.

FIG. 24 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments.

Figure 25:
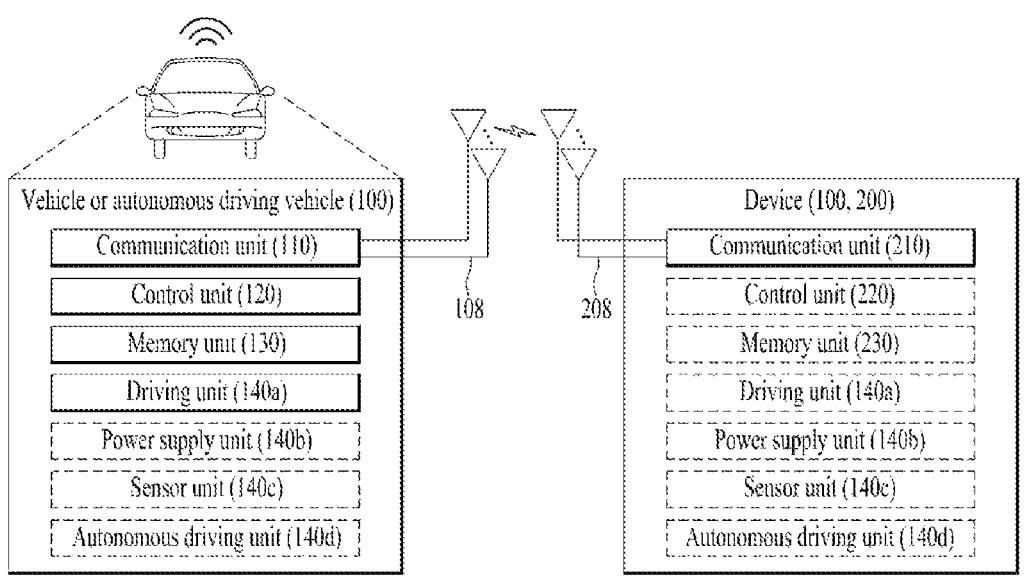
FIG. 25 illustrates an exemplary vehicle or autonomous driving vehicle to which various embodiments are applied.

FIG. 25 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

A wireless communication technology for implementing various embodiments may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in a wireless device according to various embodiments may perform communication based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless device according to various embodiments may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Various embodiments may be implemented in various means. For example, various embodiments may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL AVAILABILITY

The various embodiments of present disclosure are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
   receiving first information related to a time domain position of a transmitted synchronization signal/physical broadcast channel (SS/PBCH) block among a plurality of candidate SS/PBCH blocks in a preconfigured time duration and second information related to a quasi co-location (QCL) relationship for the transmitted SS/PBCH block; and
   obtaining a physical downlink shared channel (PDSCH) based on the first information and the second information,
   wherein:
   the PDSCH is not obtained in a resource region in which a resource for the PDSCH and a resource for the transmitted SS/PBCH block overlap with each other;
   the PDSCH is not obtained in a resource region in which the resource for the PDSCH and a resource for a candidate SS/PBCH block having the QCL relationship with the transmitted SS/PBCH block overlap with each other; and
   the PDSCH is obtained in a resource region in which the resource for the PDSCH and a resource for a candidate SS/PBCH block not having the QCL relationship with the transmitted SS/PBCH block overlap with each other.

2. The method of claim 1, wherein rate-matching is performed in (i) the resource region in which the resource for the PDSCH and the resource for the transmitted SS/PBCH block overlap with each other and (ii) the resource region in which the resource for the PDSCH and the resource for the candidate SS/PBCH block having the QCL relationship with the transmitted SS/PBCH block overlap with each other, and the rate-matching is performed in units of resource blocks (RBs).

3. The method of claim 1, wherein:
   based on that information for configuring a time duration for discovery is provided, the preconfigured time duration is the time duration for discovery; and
   based on that the information for configuring the time duration for discovery is not provided, the preconfigured time duration is a half frame.

4. The method of claim 1, wherein the plurality of candidate SS/PBCH blocks are preconfigured for an unlicensed band.

5. An apparatus operating in a wireless communication system, the apparatus comprising:
   a memory; and
   one or more processors connected to the memory,
   wherein:
   the one or more processors receive first information related to a time domain position of a transmitted synchronization signal/physical broadcast channel (SS/

PBCH) block among a plurality of candidate SS/PBCH blocks in a preconfigured time duration and second information related to a quasi co-location (QCL) relationship for the transmitted SS/PBCH block; and obtain a physical downlink shared channel (PDSCH) based on the first information and the second information, wherein:

the PDSCH is not obtained in a resource region in which a resource for the PDSCH and a resource for the transmitted SS/PBCH block overlap with each other;

the PDSCH is not obtained in a resource region in which the resource for the PDSCH and a resource for a candidate SS/PBCH block having the QCL relationship with the transmitted SS/PBCH block overlap with each other; and the PDSCH is obtained in a resource region in which the resource for the PDSCH and a resource for a candidate SS/PBCH block not having the QCL relationship with the transmitted SS/PBCH block overlap with each other.

6. The apparatus of claim 5, wherein the apparatus communicates with one or more of a mobile terminal, a network, and an autonomous driving vehicle except for a vehicle including the apparatus.

7. A method performed by a base station (BS) in a wireless communication system, the method comprising:

transmitting first information related to a time domain position of a transmitted synchronization signal/physical broadcast channel (SS/PBCH) block among a plurality of candidate SS/PBCH blocks in a preconfigured time duration and second information related to a quasi co-location (QCL) relationship for the transmitted SS/PBCH block; and transmitting a physical downlink shared channel (PDSCH) based on the first information and the second information, wherein:

the PDSCH is not transmitted in a resource region in which a resource for the PDSCH and a resource for the transmitted SS/PBCH block overlap with each other;

the PDSCH is not obtained in a resource region in which the resource for the PDSCH and a resource for a candidate SS/PBCH block having the QCL relationship with the transmitted SS/PBCH block overlap with each other; and the PDSCH is obtained in a resource region in which the resource for the PDSCH and a resource for a candidate SS/PBCH block not having the QCL relationship with the transmitted SS/PBCH block overlap with each other.

8. An apparatus operating in a wireless communication system, the apparatus comprising:

a memory; and one or more processors connected to the memory, wherein:

the one or more processors transmit first information related to a time domain position of a transmitted synchronization signal/physical broadcast channel (SS/PBCH) block among a plurality of candidate SS/PBCH blocks in a preconfigured time duration and second information related to a quasi co-location (QCL) relationship for the transmitted SS/PBCH block; and transmit a physical downlink shared channel (PDSCH) based on the first information and the second information, wherein:

the PDSCH is not transmitted in a resource region in which a resource for the PDSCH and a resource for the transmitted SS/PBCH block overlap with each other;

the PDSCH is not obtained in a resource region in which the resource for the PDSCH and a resource for a candidate SS/PBCH block having the QCL relationship with the transmitted SS/PBCH block overlap with each other; and the PDSCH is obtained in a resource region in which the resource for the PDSCH and a resource for a candidate SS/PBCH block not having the QCL relationship with the transmitted SS/PBCH block overlap with each other.

* * * * *